US011269525B2

(12) United States Patent
Wilcock et al.

(10) Patent No.: US 11,269,525 B2
(45) Date of Patent: Mar. 8, 2022

(54) CO-PROCESSING A PLURALITY OF DEPENDENT SYSTEMS WITH A FINITE NUMBER OF PROCESSING THREADS

(71) Applicant: International Business Machines Corporation, Armonk, NY (US)

(72) Inventors: Glenn Randle Wilcock, Tucson, AZ (US); Alexsey Redko, Moscow (RU)

(73) Assignee: International Business Machines Corporation, Armonk, NY (US)

( * ) Notice: Subject to any disclaimer, the term of this patent is extended or adjusted under 35 U.S.C. 154(b) by 222 days.

(21) Appl. No.: 16/734,672

(22) Filed: Jan. 6, 2020

(65) Prior Publication Data

US 2021/0208799 A1    Jul. 8, 2021

(51) Int. Cl.
 *G06F 3/06* (2006.01)
 *G06F 9/50* (2006.01)

(52) U.S. Cl.
 CPC ............ *G06F 3/0631* (2013.01); *G06F 3/067* (2013.01); *G06F 3/0613* (2013.01); *G06F 3/0647* (2013.01); *G06F 3/0653* (2013.01); *G06F 3/0665* (2013.01); *G06F 9/505* (2013.01)

(58) Field of Classification Search
 CPC .... G06F 3/0613; G06F 3/0631; G06F 3/0647; G06F 3/0665; G06F 3/067; G06F 9/505
 See application file for complete search history.

(56) References Cited

U.S. PATENT DOCUMENTS

| | | | | |
|---|---|---|---|---|
| 8,930,667 B2 * | 1/2015 | Alatorre | ............... | G06F 3/0649 |
| | | | | 711/170 |
| 9,495,223 B2 | 11/2016 | Ebcioglu | | |
| 9,602,532 B2 | 3/2017 | Goyal | | |
| 10,078,451 B1 * | 9/2018 | Floyd | ...................... | G06F 16/13 |
| 10,146,516 B2 | 12/2018 | Ebcioglu | | |
| 2008/0049276 A1 * | 2/2008 | Abe | ...................... | G06F 3/0665 |
| | | | | 358/524 |
| 2008/0307158 A1 * | 12/2008 | Sinclair | ................. | G06F 3/0643 |
| | | | | 711/103 |
| 2010/0122050 A1 * | 5/2010 | Hutchison | ............. | G06F 3/0647 |
| | | | | 711/162 |

(Continued)

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

(Continued)

*Primary Examiner* — Jorge A Chu Joy-Davila
(74) *Attorney, Agent, or Firm* — Richard B. Thomas

(57) ABSTRACT

Embodiments relate to a system, program product, and method for optimizing the throughput of an archival application through storage volume and file selection and assignment of a finite number of storage controller data movement threads associated with a plurality of storage controllers.

(Continued)

Data directed to be transferred from one or more storage controllers to non-cloud-based storage is transferred through standard I/O features. Data directed to be transferred from the storage controllers to cloud object storage devices is managed through an archival application that manages the finite number of storage controller data movement threads to provide efficient and effective transfer of the data.

20 Claims, 15 Drawing Sheets

(56) References Cited

U.S. PATENT DOCUMENTS

| | | | |
|---|---|---|---|
| 2011/0225117 A1* | 9/2011 | Nakanishi | G06F 11/3485 707/602 |
| 2012/0084262 A1* | 4/2012 | Dwarampudi | G06F 16/951 707/667 |
| 2012/0084519 A1* | 4/2012 | Vijayan | G06F 3/061 711/162 |
| 2012/0246386 A1* | 9/2012 | Akutsu | G06F 3/061 711/103 |
| 2013/0151770 A1* | 6/2013 | Hara | G06F 3/0685 711/114 |
| 2016/0018990 A1* | 1/2016 | Yun | G06F 3/0685 711/103 |
| 2016/0062689 A1* | 3/2016 | Cherubini | G06F 3/0643 711/159 |
| 2016/0224273 A1* | 8/2016 | Shinozaki | G06F 3/0617 |
| 2018/0364948 A1* | 12/2018 | Shan | G06F 3/067 |

OTHER PUBLICATIONS

Anonymous, "A Method and System for Computing a Single Thread Performance in a Simultaneous Multithreading Environment," IP.com, Disclosure No. IPCOM000237737D, Jul. 8, 2014, 3 pages. <priorart.ip.com/IPCOM/000237737>.

Anonymous, "An extensible, scalable, optimized multithreaded data loading framework for software applications," IP.com, Disclosure No. IPCOM000240374D, Jan. 28, 2015, 8 pages. <priorart.ip.com/IPCOM/000240374>.

Bergner et al., "Performance Optimization and Tuning Techniques for IBM Power Systems Processors Including IBM POWER8," IBM Redbooks, Aug. 2015, p. 274. <redbooks.ibm.com/redbooks/pdfs/sg248171.pdf>.

Tomé et al., "Optimizing Group-By and Aggregation Using GPU-CPU Co-Processing," Proceedings of the International Workshop on Accelerating Analytics and Data Management Systems Using Modern Processor and Storage Architectures, Aug. 27, 2018, 11 pages. adms-conf.org/2018-camera-ready/tome_groupby.pdf>.

"Grace Period Disclosure Statement of Applicant," dated Dec. 23, 2019, 1 page.

\* cited by examiner

CO-PROCESSING A PLURALITY OF DEPENDENT SYSTEMS WITH A FINITE NUMBER OF PROCESSING THREADS

STATEMENT REGARDING PRIOR DISCLOSURES BY THE INVENTOR OR A JOINT INVENTOR

Pursuant to 37 C.F.R. § 1.130, 35 U.S.C. §§ 102(a)(1) and 102(b)(1)(A), and MPEP §§ 2153.01(a), 2155.01, 2155.02, 2155.04, 2155.05, and 2155.06, Applicant submits for consideration in the present application that the application is being filed within a one year grace period initiated by an authorized public disclosure by the joint inventors of the application. The nature of the public disclosure is the inclusion of features described in the present patent application in a commercially-available product through a release of a product update. The date of the authorized public disclosure is conservatively disclosed as the earliest possible date the features described herein were available to the public, i.e., Jun. 6, 2019.

BACKGROUND

The present disclosure relates to co-processing data associated with a plurality of independent systems with a finite number of processing threads, and, more specifically, for optimizing the throughput of an archival application through logical volume and file selection via a finite number of application processing threads and assignment of a finite number of storage controller data movement threads associated with a plurality of storage controllers.

Many known large-scale computing and storage systems include a combination of storage controllers, cloud object storage devices, such as optical devices, and non-cloud storage devices, such as, magnetic disk storage devices and magnetic tape storage devices. The determination of when to archive the data, and which storage device to be used is often made through policy-based storage requirements by an archival application based on data file unreferenced criteria, and in many cases, cost of storage. The archival applications scan through all of the files on one or more logical volumes of the storage controllers and identify the data files to be transferred from the storage controllers to either the cloud object storage devices or non-cloud storage devices. The transfer of data from the storage controllers to the cloud object storage devices is typically conducted track-by-track through a finite number of storage controller data movement threads assigned to the storage controllers. The ratio of the number of files, or tracks that need to be moved from the storage controllers to the cloud object storage devices to the number of available storage controller data movement threads within the storage controllers is often quite large.

SUMMARY

A system, computer program product, and method are provided for optimizing the throughput of an archival application through storage logical volume and file selection and assignment of a finite number of storage controller data movement threads associated with a plurality of storage controllers.

In one aspect, a computer system is provided for co-processing a plurality of dependent systems with a finite number of processing threads. The system includes one or more processing devices and a plurality of storage devices communicatively coupled with the one or more processing devices. The plurality of storage devices includes one or more first storage devices and one or more second storage devices. The system also includes one or more memory devices communicatively coupled with the one or more processing device, and one or more archival managers communicatively coupled with the one or more memory devices. The one or more archival managers configured to determine data designated for transfer from a logical volume associated with the one or more first storage devices to the one or more second storage devices. The data in the logical volume includes one or more data files. The archival managers also distinguish the one or more data files designated for transfer as one of a first data type and a second data type. The first data type is configured to use an assignment of one thread resource of a plurality of thread resources associated with the one or more first storage devices to execute the transfer of the one or more data files of the first data type. An assigned thread resource is thereby defined. The second data type is configured to transfer without the assigned thread resource. The archival managers determine a threshold value for the logical volume. The threshold value is representative of a percentage of data files corresponding to the first data type in at least one previous processing event of the logical volume. The archival managers further determine the threshold value is not exceeded and determine one or more thread resources of the plurality of thread resources available for transferring the one or more data files of the first data type as an assigned thread resource. The archival managers also process each data file of the one or more data files of the first data type in the logical volume designated for transfer. The one or more archival managers further configured to obtain, individually, for each data file of the first data type in the logical volume designated for transfer, an assigned thread resource. The archival managers are further configured to transfer, individually, each data file of the first data type in the logical volume designated for transfer, from the one or more first storage devices to the one or more second storage devices through each assigned thread resource.

In another aspect, a computer program product is provided for co-processing a plurality of dependent systems with a finite number of processing threads. The computer program product includes one or more computer readable storage media and program instructions collectively stored on the one or more computer-readable storage media. The program instructions include program instructions to determine data designated for transfer from a logical volume associated with one or more first storage devices to one or more second storage devices. The data in the logical volume includes one or more data files. There are program instructions to distinguish the one or more data files designated for transfer as one of a first data type and a second data type. The first data type is configured to use an assignment of one thread resource of a plurality of thread resources to execute the transfer of the one or more data files of the first data type. An assigned thread resource is thereby defined. The second data type configured to transfer without the assigned thread resource. The product includes program instructions to determine a threshold value for the logical volume. The threshold value is representative of a percentage of data files corresponding to the first data type in at least one previous processing event of the logical volume. There are program instructions to determine the threshold value is not exceeded. The product further includes program instructions to determine one or more thread resources of the plurality of thread resources available for transferring the one or more data files of the first data type as an assigned thread resource.

There are also program instructions to process each data file of the one or more data files of the first data type in the logical volume designated for transfer. These program instructions include instructions to obtain, individually, for each data file of the first data type in the logical volume designated for transfer, an assigned thread resource. These program instructions also transfer, individually, each data file of the first data type in the logical volume designated for transfer, from the one or more first storage devices to the one or more second storage devices, through each assigned thread resource.

In yet another aspect, a computer-implemented method for co-processing a plurality of dependent systems with a finite number of processing threads is provided. The method includes determining data designated for transfer from a logical volume associated with one or more first storage devices to one or more second storage devices. The data in the logical volume includes one or more data files. The method also includes distinguishing the one or more data files designated for transfer as one of a first data type and a second data type. The first data type is configured to use an assignment of one thread resource of a plurality of thread resources to execute the transfer of the one or more data files of the first data type. An assigned thread resource is thereby defined. The second data type is configured to transfer without an assigned thread resource. The method also includes determining a threshold value for the logical volume. The threshold value is representative of a percentage of data files corresponding to the first data type in at least one previous processing event of the logical volume. The method also includes determining the threshold value is not exceeded. The method further includes determining one or more thread resources of the plurality of thread resources available for transferring the one or more data files of the first data type as an assigned thread resource. The method also includes processing each data file of the one or more data files of the first data type in the logical volume designated for transfer. The method further includes obtaining, individually, for each data file of the first data type in the logical volume designated for transfer, an assigned thread resource. The method also includes transferring, individually, each data file of the first data type in the logical volume designated for transfer, from the one or more first storage devices to the one or more second storage devices through each assigned thread resource.

The present Summary is not intended to illustrate each aspect of, every implementation of, and/or every embodiment of the present disclosure. These and other features and advantages will become apparent from the following detailed description of the present embodiment(s), taken in conjunction with the accompanying drawings.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are illustrative of certain embodiments and do not limit the disclosure.

Figure 1:
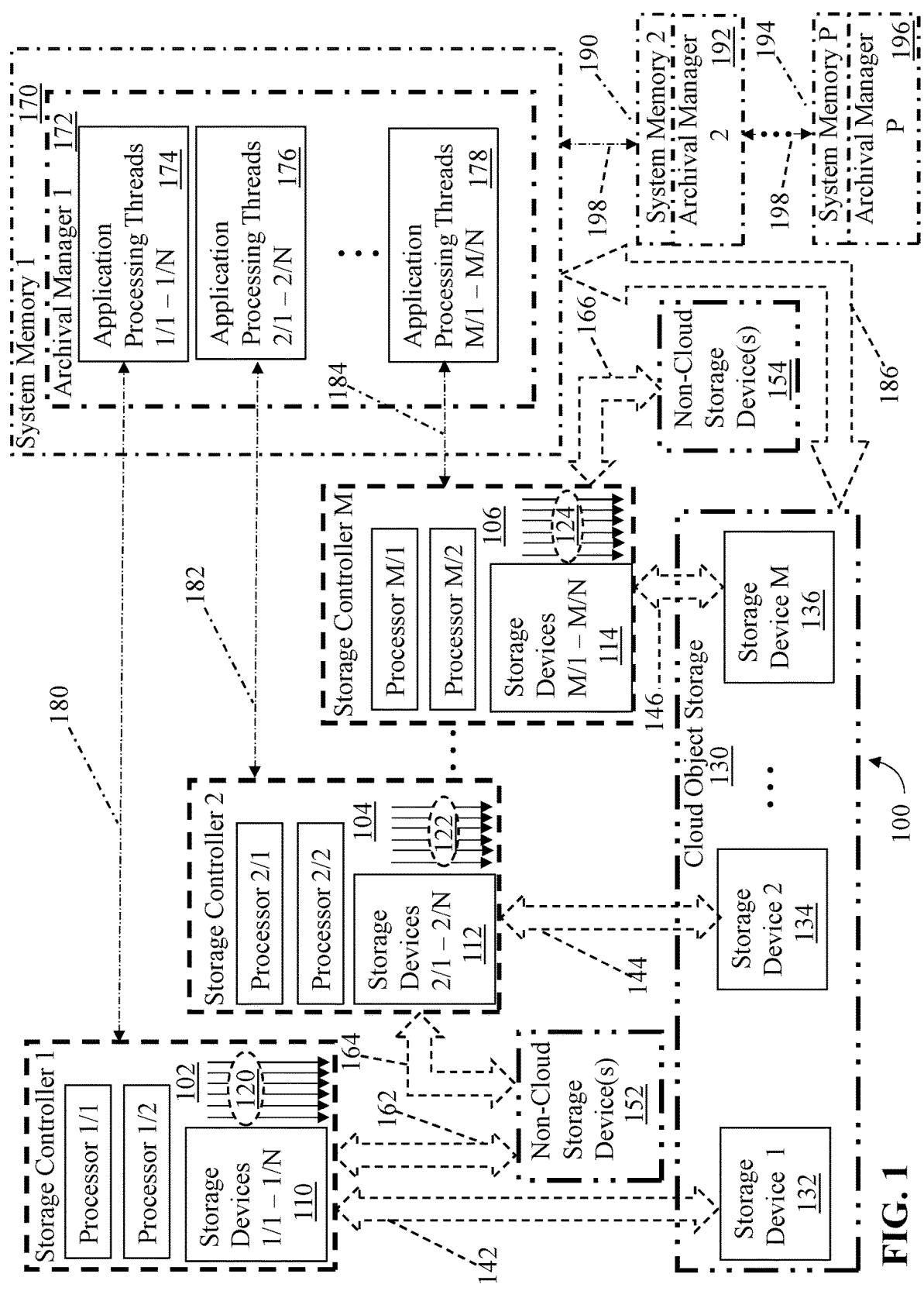
FIG. 1 is a schematic diagram illustrating a global computing environment suitable for optimizing the throughput of a plurality of archival managers, in accordance with some embodiments of the present disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

It will be readily understood that the components of the present embodiments, as generally described and illustrated in the Figures herein, may be arranged and designed in a wide variety of different configurations. Thus, the following details description of the embodiments of the apparatus, system, method, and computer program product of the present embodiments, as presented in the Figures, is not intended to limit the scope of the embodiments, as claimed, but is merely representative of selected embodiments.

Reference throughout this specification to "a select embodiment," "at least one embodiment," "one embodiment," "another embodiment," "other embodiments," or "an embodiment" and similar language means that a particular feature, structure, or characteristic described in connection with the embodiment is included in at least one embodiment. Thus, appearances of the phrases "a select embodiment," "at least one embodiment," "in one embodiment," "another embodiment," "other embodiments," or "an embodiment" in various places throughout this specification are not necessarily referring to the same embodiment.

The illustrated embodiments will be best understood by reference to the drawings, wherein like parts are designated by like numerals throughout. The following description is intended only by way of example, and simply illustrates certain selected embodiments of devices, systems, and processes that are consistent with the embodiments as claimed herein.

Large-scale computer systems include extensive data storage and execute a significant amount of data movement. Many of these large-scale computing and storage systems include a combination of storage controllers with the associated storage devices, cloud object storage devices, such as optical devices, and non-cloud storage devices, such as, magnetic disk storage devices and magnetic tape storage devices. The determination of which of the cloud and non-cloud storage devices to be used is often made through policy-based storage requirements by an archival application based on data file unreferenced criteria, and in many cases, cost of storage. For example, data may be stored on the storage devices of the storage controllers for a policy-based amount of time. If such data is not referenced within the allotted time period, or if the data is no longer having a valid association with an application due to a change or removal of the application, the archival application directs the transfer of the data to the cloud and non-cloud storage devices as a function of the policy-based requirements for the data. The policy-based criteria may be overridden through operator command.

The archival application scans through all of the files on one or more logical volumes of the storage controllers and identifies the data files to be transferred from the storage controllers to either the cloud object storage devices or non-cloud storage devices. The archival application includes a finite number of application processing threads, where each application processing thread includes sufficient logic to scan files on an associated storage controller, determine if a file should be moved per the associated policy, distinguish between files designated for cloud storage and non-cloud storage based on the policy, logic to select the associated logical volume, logic to move the file per the policy, and logic to serialize the movement of the file including logic to wait until a storage controller data movement thread is free.

The transfer of data from the storage controllers to the cloud object storage devices is typically conducted track-by-track through a finite number of storage controller data movement threads assigned to the storage controllers. The storage controller data movement threads facilitate the movement of the data from the storage controllers to the cloud object storage devices by providing a simple direct interface therebetween. In contrast, the transfer of data from the storage controllers to, for example, magnetic tape storage is performed through the standard input/output (I/O) features of the computer system due to the lack of a direct interface, and therefore do not require use of the storage controller data movement threads. The transfer of the data files to the cloud and non-cloud storage devices is controlled by the application processing threads.

The ratio of the number of files, or tracks that need to be moved from the storage controllers to the cloud object storage devices to the number of available storage controller data movement threads within the storage controllers is often quite large. For example, for the circumstances where the archival application has determined that there are hundreds of thousands of files to be moved from a suite of storage controllers, there may only be six storage controller data movement threads available for each controller to transfer the data. The archival application, through the application processing threads, will select logical volumes of a particular storage controller to transfer the individual files therein and will proceed from storage controller-to-storage controller. Therefore, much of the data to be transferred across the suite of storage controllers will be held in the storage controllers for future transfer through one of the storage controller data movement threads on an ad hoc basis. For example, while the archival application and the associated application processing threads are processing data movement from a first storage controller, the existing six storage controller data movement threads will be overloaded until the transfer of the files from that first storage controller is exhausted. In the meantime, the files awaiting transfer from a second storage controller will remain in the second storage controller until the archival application and the associated application processing threads initiate the transfer through the six storage controller data movement threads available to that storage controller. Therefore, the threads for one storage controller will be overloaded while the threads for other storage controllers will remain idle. These inefficiencies are exacerbated when there are multiple archival applications on multiple dependent systems managing the movement of data on the suite of storage controllers. Accordingly, the overall efficiency of the data transfer from the storage controllers to the cloud object storage is low.

A system, computer program product, and method are disclosed and described herein for optimizing the co-processing of one or more dependent systems with a finite number of available application processing threads utilizing an optimization algorithm. Each dependent system includes a software-based archival application, or archival manager and the two or more software-based archival managers are employed to optimize the data transfer throughput. Each archival manager includes a plurality of application processing threads. Each application processing thread includes sufficient logic to scan files on an associated controller storage device, determine if a file should be moved per the associated policy, distinguish between files designated for cloud storage and non-cloud storage based on the policy, logic to select the associated logical volume, logic to move the file per the policy, and logic to serialize the movement of the file including logic to wait until a storage controller data movement thread is free. A plurality of archival managers at least partially defines a global environment. For example, there may be P instances of the archival manager that are active and each instance has a maximum number of N application processing threads, for a combined total of (P×N) application processing threads active in the global environment.

A plurality of storage controllers, i.e., from 1 to M storage controllers, each with a finite number of storage controller data movement threads, transfer data from a plurality of storage devices in each storage controller, i.e., from 1 to N storage devices, where each of the N storage devices has an associated application processing thread resident within the associated archival manager. The number of application processing threads is far greater than the number of storage controller data movement threads. The associated application processing thread determines the logical volume and file selection for movement to either cloud object storage via one of the storage controller data movement threads or non-cloud storage via designated standard I/O features. For the data transfers to cloud object storage, if all of the storage controller data movement threads for the storage controller are employed, a waiting queue receives and stores the data transfer requests until one of the storage controller data movement threads becomes available.

A plurality of global serialization resources are defined, where each global serialization resource corresponds to one of the storage controller data movement threads. Each global serialization resource includes a storage controller, a processor within the controller, and an assigned storage controller data movement thread associated with that processor. Therefore, a storage controller with two processors and three storage controller data movement threads per processor has six potential global serialization resources. Accordingly, the global serialization resources facilitate an organized and optimized transfer of data files to cloud object storage originating with data transfer requests from the plurality of archival managers.

There are three general conditions for the files selected for archiving on a logical volume defined in one or more storage controllers. The first condition is that none of the files designated for archival in the selected logical volume are to be transferred to the cloud object storage devices. The second condition is that all of the files designated for archival in the selected logical volume are to be transferred to the cloud object storage devices. The third condition is that the files selected for archival within the selected logical volume are a combination of files designated for cloud-based and non-cloud-based storage. For each of the three conditions, the selected logical volume may include files not selected for archiving as well as the files selected for archiving.

For the first condition, where none of the files on a logical volume selected for archiving will be transferred to the cloud object storage devices (based on policy requirements or specified by user command), the use of a global serialization resource is not required. Rather, the files will be transferred to one or more non-cloud-based storage devices through features, such as, and without limitation, standard software-driven input/output (I/O). No additional checks or restrictions on the data movement are required. Accordingly, the logical volume will be selected for unconditional processing through the associated processors in the storage controller(s) and all of the files selected for archival will be transferred to the appropriate storage device.

For the second condition, where all of the files on the selected logical volume selected for archiving will be transferred to the cloud object storage devices (based on policy requirements or specified by user command), the use of one global serialization resource will be required. The associated application processing thread within the associated archival manager will conditionally obtain an exclusive lock on one of the global serialization resources for the storage controller, including the associated processor and storage controller data movement thread. Specifically, the associated application processing thread will query the associated storage controller to determine if the controller, appropriate processor, and one of the assigned storage controller data movement threads are available to execute the transfer as a selected global serialization resource. If there are no global serialization resources immediately available, the selected logical volume will be skipped and another logical volume will be selected for processing. The skipped logical volume will be retried at a later time. The most likely reason for the global serialization resource being unavailable is the employment of the associated storage controller data movement threads for other transfers, possibly by another archival manager in the global computing environment. Accordingly, the associated application processing thread (and the memory it resides on) is not consumed with a latent, unproductive process, thereby allowing another application processing thread an opportunity to effect a transfer.

For the third condition, where there is a mixture of files in the logical volume designated for archiving in both cloud-based and non-cloud-based storage, a global serialization algorithm will be employed to execute the data movement. Initially, a threshold value is defined to determine if a global serialization resource should be held with an exclusive lock, or if a global serialization resource should be obtained intermittently. The threshold value is a percentage of files processed for archiving from the selected logical volume during the previous occurrence of file archiving that required a global serialization resource for transfer to cloud-based storage. The determination of the threshold value is initialized at zero, and is recalculated for each transfer. In one embodiment, a default threshold value that may be used is 40%.

If the percentage of files that previously required a storage controller data movement thread exceeds the threshold value, then a global serialization resource is unconditionally obtained for processing the logical volume. If the resource cannot be immediately obtained, then the logical volume is skipped, retried later, and another logical volume is selected for processing. If the number of files that previously required a storage controller data movement thread is less than or equal to the threshold value, then processing of the data files selected for archiving on the logical volume is initiated. Processing of the selected files in the logical volume proceeds file-by-file on the logical volume. As a file is encountered that needs to consume a storage controller data movement thread, then a global serialization resource is attempted to be obtained. If it is immediately obtained, then the required storage thread is available and the file is selected for processing and is transferred to the associated cloud object storage device. If there are no global serialization resources available, no storage controller data movement thread is obtained, the file is skipped so that the associated application processing thread is not queued waiting for an available storage thread, and the file is retried at a later time. As a portion of the file-by-file processing, those files not destined for cloud storage are processed through the standard I/O features and archived to the associated non-cloud-based storage device. At the end of processing the logical volume, if any files still remain that were skipped because a storage data movement thread was not available, a wait/retry loop is executed until an overall timeout value is reached. Upon expiration of the timeout, the remaining files designated for archiving not yet transferred from the logical volume are skipped and the next logical volume is selected for processing. Accordingly, a logical volume with a mix of files designated for archiving will leverage a threshold evaluation to determine whether an exclusive lock on a global serialization resource will be employed to transfer the files to cloud storage or whether a file-by-file acquisition of a global serialization resource will be employed.

The computing environment is a global environment, including a plurality of archival managers performing similar operations of archiving files resident on the suite of storage controllers. Therefore, each of the archival managers is typically vying for global serialization resources. Each of the archival managers across the global computing environment is attempting to obtain a storage controller data movement thread for one of the storage controllers and it is inevitable that two or more of the archival managers attempt to obtain a storage controller data movement thread in the same controller. Therefore, the storage controller data movement threads are obtained through a first-come-first-served basis, and a queuing process for thread requests is implemented as a wait/retry loop, as discussed further herein. These features are integrated into a practical application that improves the operation of co-processing computing systems by increasing the efficiency of data archiving operations while maintaining a large application processing thread-to-storage controller data movement thread ratio through serializing the access to the storage controller data movement threads by the application processing threads. The resulting improved employment of the limited number of storage controller data movement threads decreases file processing latencies, global serialization resource overloading, and global serialization resource idling, thereby improving the functioning of the associated computer systems.

The algorithm for processing a mixture of files in logical volumes designated for archiving in both cloud-based and non-cloud-based storage may be generalized and extrapolated to treat the plurality of archiving managers as a plurality of dependent co-processing systems. The co-dependency of the archival managers within the global computing environment is associated with the limited number of storage controller data movement threads. Therefore, each of the archival managers associated with otherwise independent computing systems assigns work to one or more other computing systems, i.e., in the embodiments described herein, a plurality of storage controllers and cloud-based and non-cloud-based storage systems. Since the archiving operations for the storage controllers are typically continuous with a large volume of file archiving, the logical volumes across the suite of storage controllers are selected such that the storage controller data movement threads are employed continuously, and the threads are typically not immediately available, thereby necessitating exercising the wait/retry loop logic.

Accordingly, the embodiments described herein improve the efficiency of continuously archiving data files with serial management of the files by multiple systems.

Therefore, even though the embodiments described herein relate to cloud object storage, the principles and features of the global serialization algorithm described herein may be extended to any set of dependent co-processing systems where there is a limited number of threads for any type of data movement processing at both the software application and storage controller level, and is not limited to file archiving. Accordingly, this disclosure may be extended to any set of systems with a finite number of application processing threads, where each of the systems is invoking one of the other systems and do not want to consume any of those processing threads waiting on available threads in the other system if the maximum threading level has already been reached.

Referring to FIG. 1, a schematic diagram is provided illustrating a global computing environment, i.e., a global computing system 100 suitable for optimizing the throughput of a plurality of archival managers through logical volume and file selection and assignment of global serialization resources including a finite number of storage controller data movement threads associated with a plurality of storage controllers.

The global computing system 100 includes a plurality of storage controllers, i.e., a first storage controller 102, a second storage controller 104, and an $M^{th}$ storage controller 106. In at least one embodiment, each of the storage controllers 102-106 are independent devices, with separate physical locations, and not directly communicatively coupled to each other. In at least one embodiment, the storage controllers 102-106 are positioned in a common physical area and are communicatively coupled through a common data bus (not shown). In at least one embodiment, a combination of independent and communicatively coupled devices define the suite of storage controllers 102-106. In one embodiment, only the first storage controller 102 is available. The variable M can be any integer that enables operation of the global computing system 100 as described herein. Therefore, in at least one other embodiment, the number of storage controllers exceeds 100 devices. Accordingly, the global computing system 100 includes one or more storage controllers.

In one embodiment, each of the storage controllers 102-106 includes two processors. The first storage controller 102 includes a first processor 1/1 and a second processor 1/2, the second storage controller 104 includes a first processor 2/1 and a second processor 2/2, and the $M^{th}$ storage controller includes a first processor M/1 and a second processor M/2. In one embodiment, each of storage controllers 102-106 include any number of processors that enables operation of the global computing system 100 as described herein. Each of the storage controllers 102-106 also include a plurality of storage devices. The each of the first, second, and $M^{th}$ 102-106 storage controllers include one or more first storage devices. Specifically, the first storage controller 102 includes a plurality of controller storage devices 110 that include controller storage devices 1/1-1/N. The second storage controller 104 includes a plurality of controller storage devices 112 that include controller storage devices 2/1-2/N. The $M^{th}$ storage controller 106 includes a plurality of controller storage devices 114 that include controller storage devices M/1-M/N.

In one embodiment, the value of N is 256. In other embodiments, N is any integer that enables operation of the global computing system 100. In at least one embodiment, the storage controllers 102-106 have a different number of controller storage devices 110-114, respectively. In at least one embodiment, the processors of each of the storage controllers 102-106 are communicatively coupled to half of the controller storage devices 110-114, respectively. Therefore, in those embodiments, with respect to the first storage controller 102, controller storage devices 1/1-1/128 of the plurality of controller storage devices 110 are coupled to the processor 1/1 and controller storage devices 1/129-1/256 of the plurality of controller storage devices 110 are coupled to the processor 1/2. With respect to the second storage controller 104, controller storage devices 2/1-2/128 of the plurality of controller storage devices 112 are coupled to the processor 2/1 and controller storage devices 2/129-2/256 of the plurality of controller storage devices 112 are coupled to the processor 2/2. With respect to the $M^{th}$ storage controller 106, controller storage devices M/1-M/128 of the plurality of controller storage devices 114 are coupled to the processor M/1 and controller storage devices M/129-M/256 of the plurality of controller storage devices 114 are coupled to the processor M/2. In at least some alternative embodiments, any number of controller storage devices are coupled to any processor that enables operation of the global computing system 100. Accordingly, each storage controller includes a plurality of processors, each processor dedicated to processing a predetermined portion of the controller storage devices.

Each of the storage controllers 102-106 includes a plurality of storage controller data movement threads. The transfer of data from the storage controllers to cloud object storage devices (discussed further herein) is typically conducted track-by-track through a finite number of storage controller data movement threads assigned to the storage controllers 102-106. The storage controller data movement threads facilitate the movement of the data from the storage controllers 102-106 to the cloud object storage devices by providing a simple direct interface therebetween. In the exemplary embodiment, the first storage controller 102 includes six storage controller data movement threads 120. In alternative embodiments, the first storage controller 102 includes any number of storage controller movement threads 120 that enables operation of the global computing system 100 as described herein, including, without limitation, 12 threads 120. The six storage controller data movement threads 120 are evenly divided between the two processors 1/1 and 1/2, i.e., three of the storage controller data movement threads 120 support processing of the files stored on the controller storage devices 1/1-1/128 of the plurality of controller storage devices 110 through the processor 1/1. Similarly, three of the storage controller data movement threads 120 support processing of the files stored on the controller storage devices 1/129-1/256 of the plurality of controller storage devices 110 through the processor 1/2.

In the exemplary embodiment, the second storage controller 104 includes six storage controller data movement threads 122. In alternative embodiments, the second storage controller 104 includes any number of storage controller movement threads 122 that enables operation of the global computing system 100 as described herein, including, without limitation, 12 threads 122. The six storage controller data movement threads 122 are evenly divided between the two processors 2/1 and 2/2, i.e., three of the storage controller data movement threads 122 support processing of the files stored on the controller storage devices 2/1-2/128 of the plurality of controller storage devices 112 through the processor 2/1. Similarly, three of the storage controller data movement threads 122 support processing of the files stored on the controller storage devices 2/129-2/256 of the plurality of controller storage devices 112 through the processor 2/2. Also, in the exemplary embodiment, the $M^{th}$ storage controller 106 includes six storage controller data movement threads 124. In alternative embodiments, the $M^{th}$ storage controller 106 includes any number of storage controller movement threads 124 that enables operation of the global computing system 100 as described herein, including, without limitation, 12 threads 124. The six storage controller data movement threads 124 are evenly divided between the two processors M/1 and M/2, i.e., three of the storage controller data movement threads 124 support processing of the files stored on the controller storage devices M/1-M/128 of the plurality of controller storage devices 114 through the processor M/1. Similarly, three of the storage controller data movement threads 124 support processing of the files stored on the controller storage devices M/129-M/256 of the plurality of controller storage devices 114 through the processor M/2. In at least some embodiments, the number of storage controller data movement threads 120, 122, and 124 is selectable. In at least some additional embodiments, any number of storage controller data movement threads 120, 122, and 124 that enables operation of the global computing system 100 as described herein is used.

A plurality of global serialization resources are defined, where each global serialization resource corresponds to one of the storage controller data movement threads. Each global serialization resource includes a storage controller selected from the group of storage controllers 102-106. Each global serialization resource also includes a processor within the associated controller, such as one of processors 1/1 and 1/2, processors 2/1 and 2/2, and processors M/1 and M/2 for the storage controllers 102-106, respectively. Each global serialization resource also includes one of the three storage controller data movement threads 120, 122, and 124 for the processors 1/1 and 1/2, processors 2/1 and 2/2, and processors M/1 and M/2, respectively. Therefore, the makeup of the global serialization resources varies as the requests for data movement from the first archival manager 172 vary. In one embodiment, N is 256, therefore there are 256 application processing threads 174 configured to control the six storage controller data movement threads 120. As discussed further herein, additional archival managers with additional application processing threads will also attempt to control the six storage controller data movement threads 120. The limiting feature associated with attempting to gain access to a global serialization resources will typically be the availability of one of the three storage controller data movement threads 120 associated with the processor for the storage devices where the requested file(s) reside. Accordingly, defining each of the possible global serialization resources as a storage controller, an associated processor, and an associated storage controller data movement thread facilitates the organized, optimized, and serialized fulfillment by the proper assigned resources.

The global computing system 100 includes one or more second storage devices, i.e., one or more cloud object storage arrays 130 that includes a plurality of cloud storage devices, i.e., a first cloud storage device 132, a second cloud storage device 134, up to an $M^r$ cloud storage device 136. In the exemplary embodiment, there is a one-to-one communicative coupling between the storage controllers 102-106 and the cloud storage devices 132-136, as shown by the arrows 142-146. In some alternative embodiments, any number of storage controllers is communicatively coupled to any number of cloud storage devices that enable operation of the global computing system 100 as described herein. Also, in some embodiments, at least a portion of the cloud storage devices 132-136 are communicatively coupled to each other. The cloud object storage array 130 is configured to store data files of a first type, i.e., files designated for cloud storage. The global computing system 100 includes one or more additional second storage devices, i.e., one or more of non-cloud storage devices that includes non-cloud storage devices 152 and 154 communicatively coupled to the storage controllers 102-106 as indicated by the arrows 162-166. The non-cloud storage devices 152 and 154 are configured to store data files of a second type, i.e., non-cloud-designated files. Accordingly, the global computing system 100 includes a combination of cloud-based and non-cloud-based storage.

The global computing system 100 includes one or more communicatively coupled computing systems, where only the memory devices of the systems are shown in FIG. 1 for clarity. A first system memory 170 includes a first archival manager 172 that includes a plurality of finite application processing threads. As shown in FIG. 1, the first archival manager 172 includes a first plurality of application processing threads 174 that includes application processing threads 1/1-1/N, where N is the same number as the number of controller storage devices 110. Similarly, the first archival manager 172 includes a second plurality of application processing threads 176 that includes application processing threads 2/1-2/N, where N is the same number as the number of controller storage devices 112. Further, the first archival manager 172 includes an $M^{th}$ plurality of application processing threads 178 that includes application processing threads M/1-M/N, where N is the same number as the value for the number of controller storage devices 114 and M is the same number as the number of storage controllers 102-106.

The first plurality of application processing threads 174 is communicatively coupled to the first storage controller 102 as shown by the arrow 180. Each of application processing threads 1/1-1/N shares an association with the identically named storage devices 1/1-1/N, respectively. In addition, each of the application threads 1/1-1/N has sufficient program instructions embedded therein to control the six global serialization resources available within the first storage controller 102. Specifically, without limitation, each of application processing threads 1/1-1/N includes sufficient logic to scan files on an associated controller storage device, determine if a file should be moved per the associated policy, distinguish between files designated for cloud storage and non-cloud storage based on the policy, logic to select the associated logical volume, logic to move the file per the policy, and logic to serialize the movement of the file including logic to wait until a storage controller data movement thread is free. Similarly, the second plurality of application processing threads 176 is communicatively coupled to the second storage controller 104 as shown by the arrow 182 and the $M^{th}$ plurality of application processing threads 178 is communicatively coupled to the $M^{th}$ storage controller 106 as shown by the arrow 184. In addition, the first archival manager 172 is communicatively coupled to the cloud object storage array 130 as indicated by the arrow 186 to facilitate file transfers to the cloud object storage array 130. The first archival manager 172 is also communicatively coupled to the non-cloud storage devices 152 and 154, where arrows are not shown for clarity. Accordingly, the archival manager 172 including the first, second, and $M^{th}$ pluralities of the application processing threads 174, 176, and 178, respectively, is configured to facilitate the global serialization of file transfers.

In at least one embodiment, the limit to the number of application processing threads 174, 176, and 178 allowed to run at any one point in time is 64 due to constraints provided by the system memory 170. Therefore, the limitation of 64 application processing threads to control the six storage controller data movement threads 120-124 for each of the storage controllers 102-106, respectively, facilitates the serialized data archival as described herein. In at least some embodiments, any number of application processing threads 174, 176, and 178 are allowed to run at any one point in time that enables operation of the global computing system 100 as described herein.

The global computing system 100 includes additional systems including a second system memory 190 with a second archival manager 192, and a $P^{th}$ system memory 194 with a $P^{th}$ archival manager 196. The value of P is any integer that enables operation of the global computing system 100 as described herein. The first archival manager 172, the second archival manager 192, and the $P^{th}$ archival manager 196 are communicatively coupled to each other as indicated by the arrows 198. In at least one embodiment, the first, second, and $P^{th}$ system memories 170, 190, and 194, respectively, are substantially similar. In addition, in at least one embodiment, the first, second, and $P^{th}$ archival managers 172, 192, and 196, respectively, are substantially similar. Therefore, in such embodiments, 64 application processing threads are the limit for each of the second and $P^{th}$ archival managers 192, and 196, respectively, and the additional application processing threads vying for the limited number of storage controller data movement threads 120, 122, and 124 increase the stressing of the serialized global data archiving within the global computing system 100. As discussed further herein, the overall stressing of the limited number of storage controller data movement threads 120, 122, and 124 is significantly mitigated with respect to FIG. 2. In at least one other embodiment, the first, second, and $P^{th}$ system memories 170, 190, and 194, respectively, are substantially different. Similarly, in at least one other embodiment, the first, second, and $P^{th}$ archival managers 172, 192, and 196, respectively, are substantially different.

Figure 2:
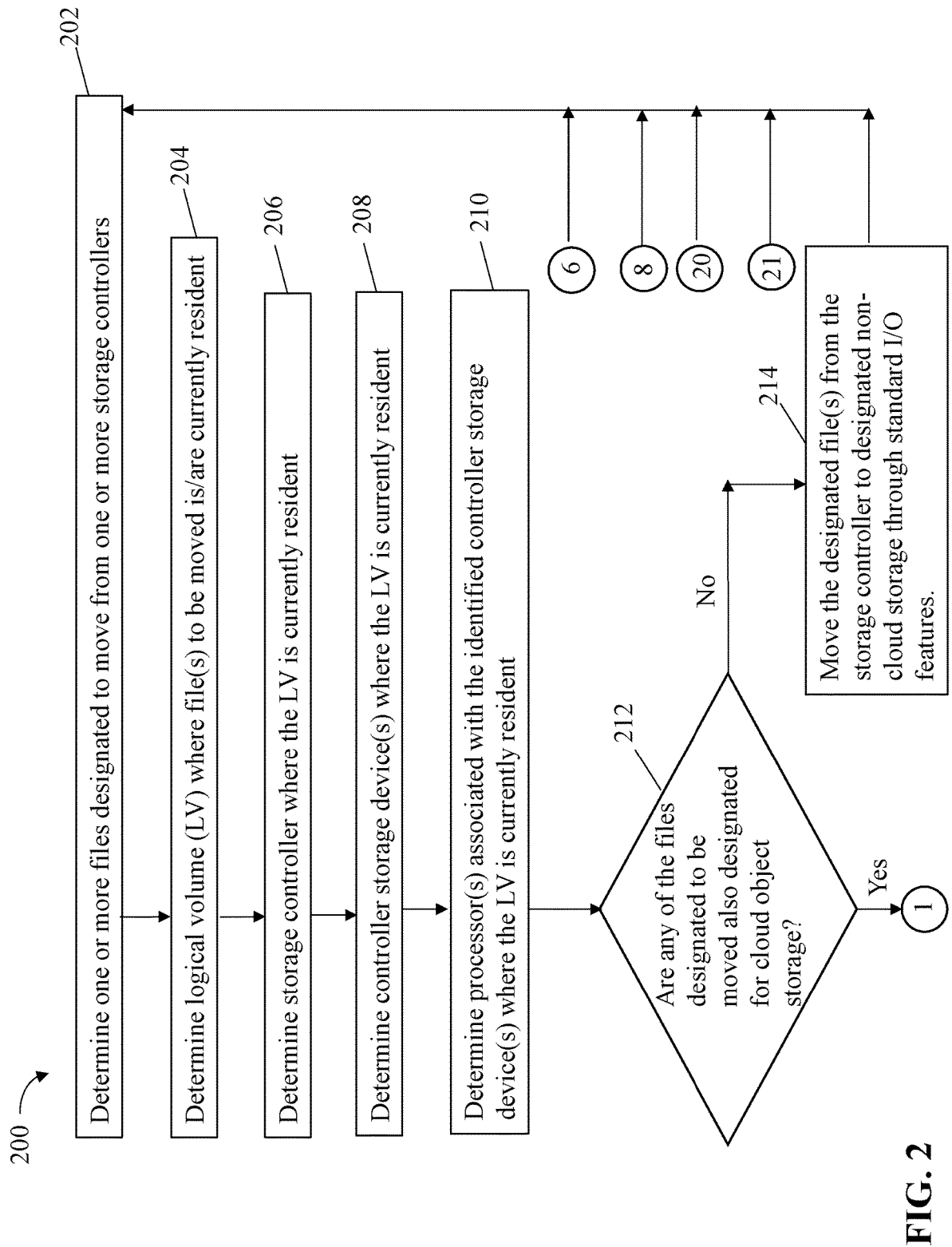
FIG. 2 is a flow chart illustrating a process for transferring data, in accordance with some embodiments of the present disclosure.
Figure 2:
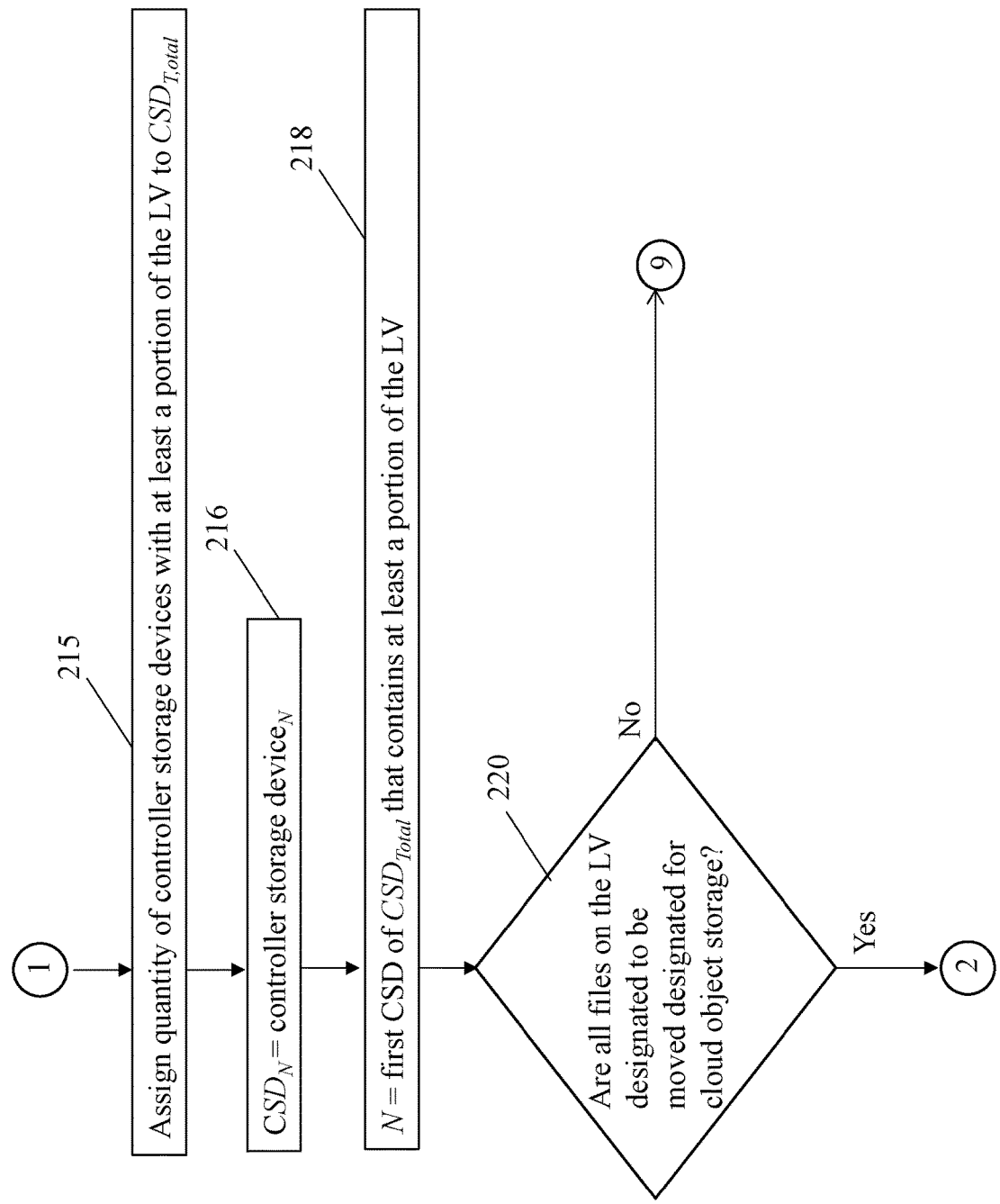
Figure 2:
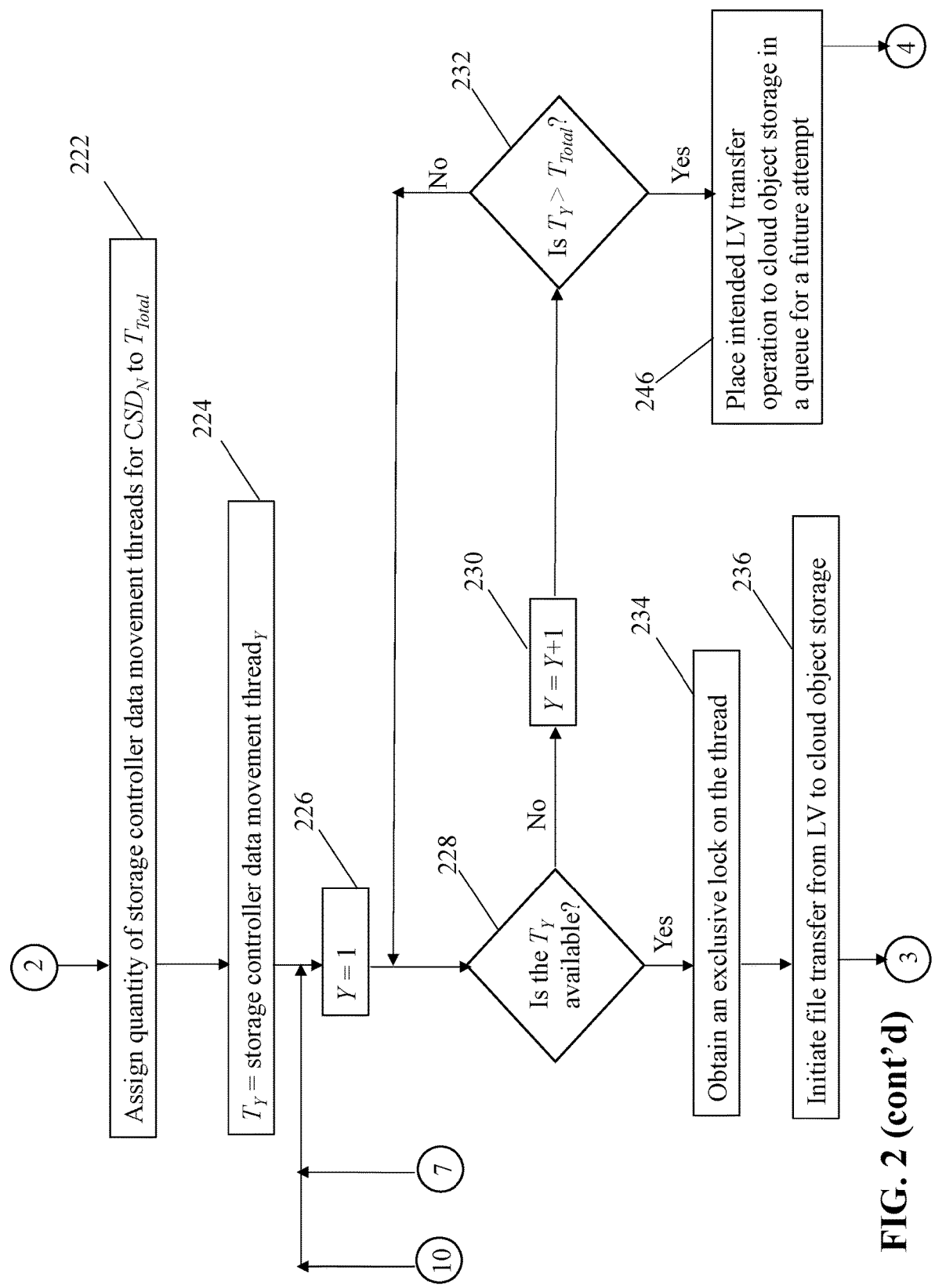
Figure 2:
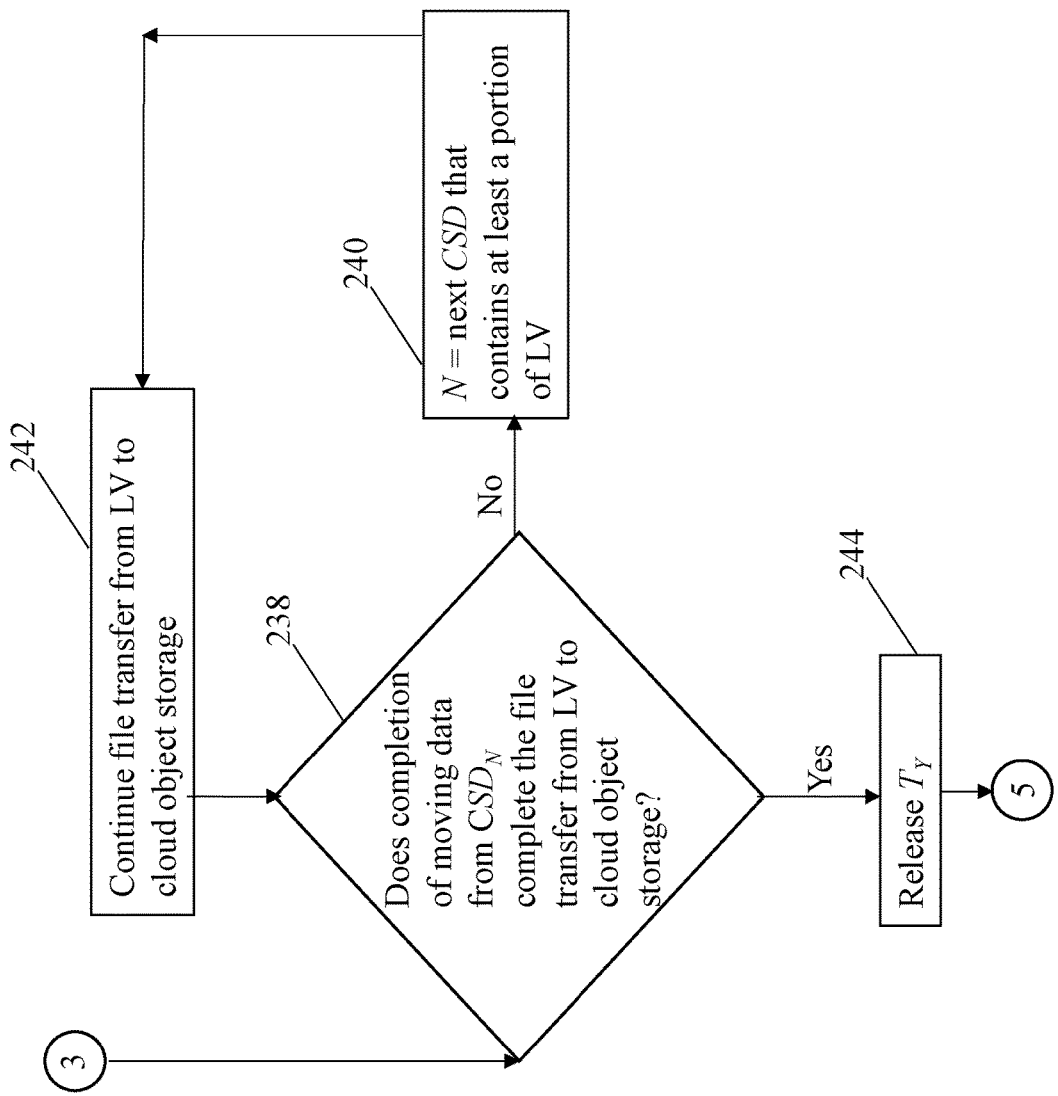
Figure 2:
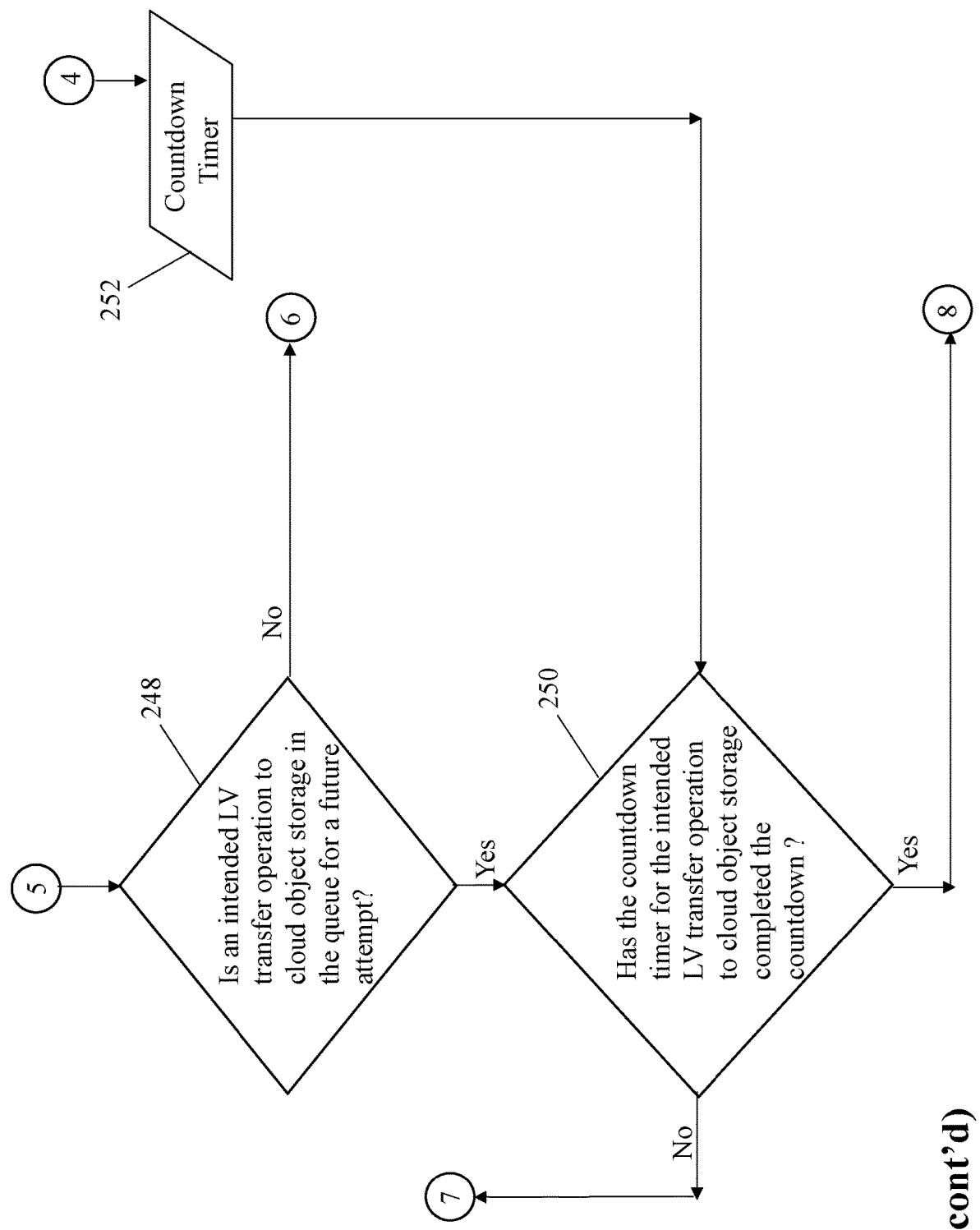
Figure 2:
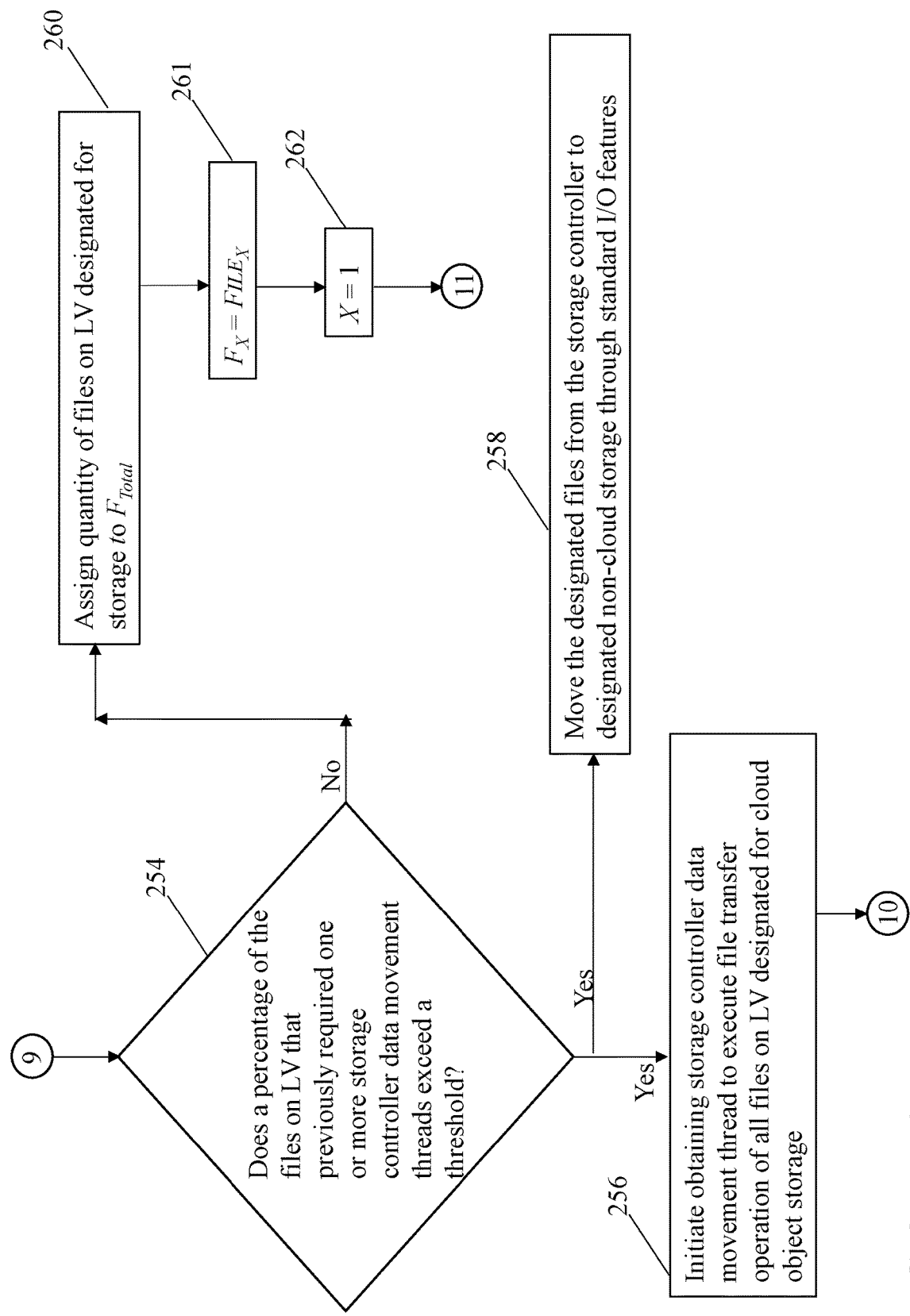
Figure 2:
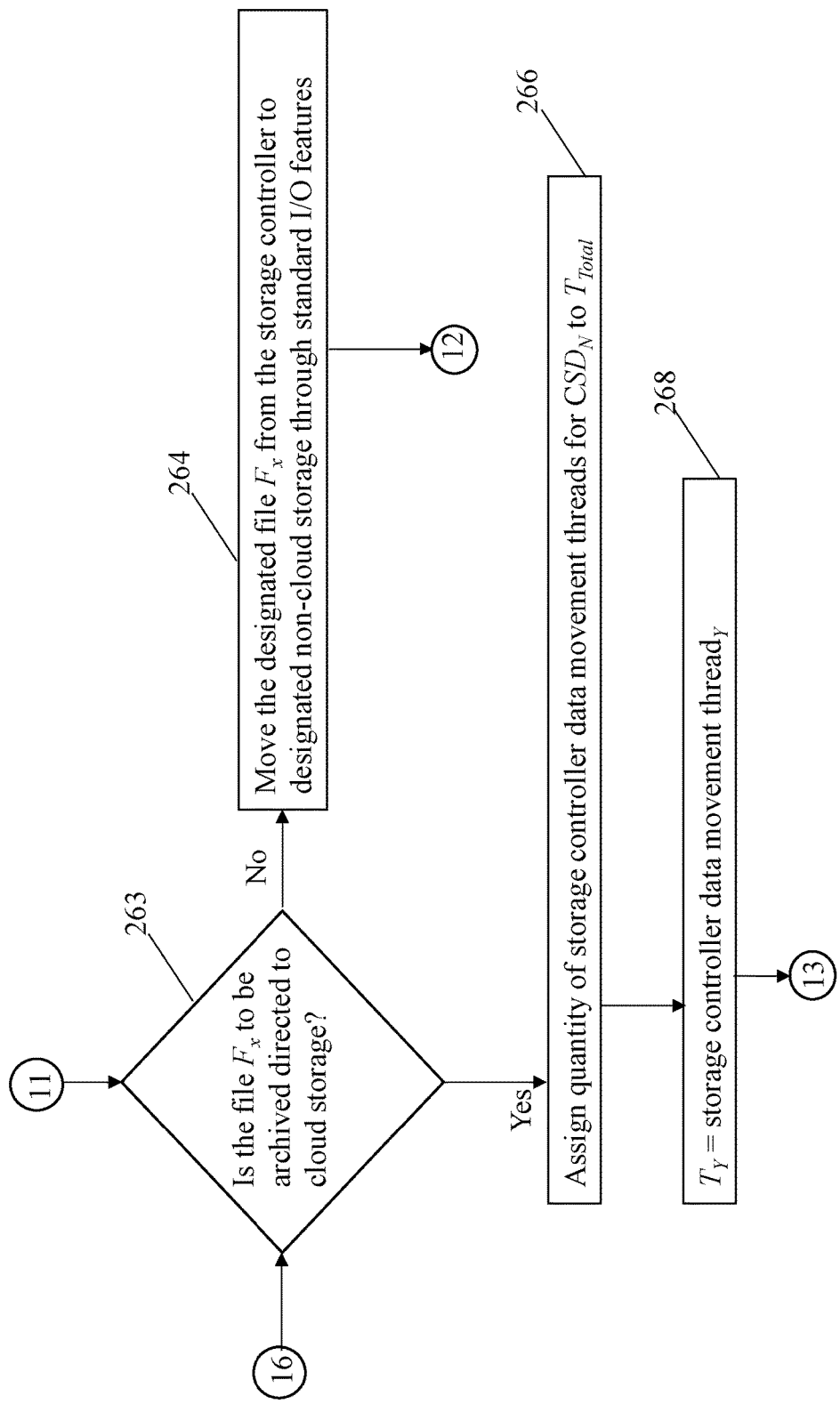
Figure 2:
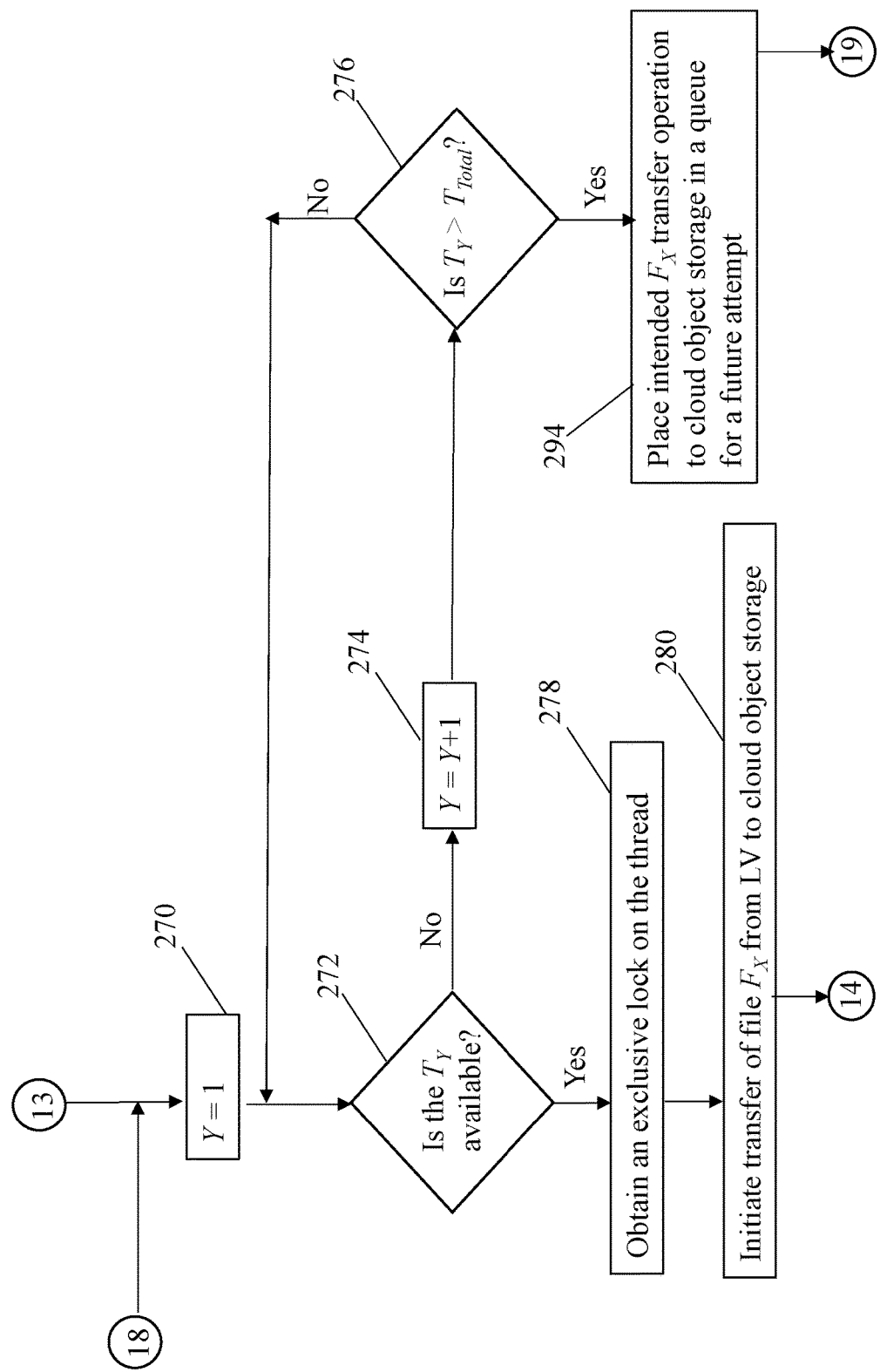
Figure 2:
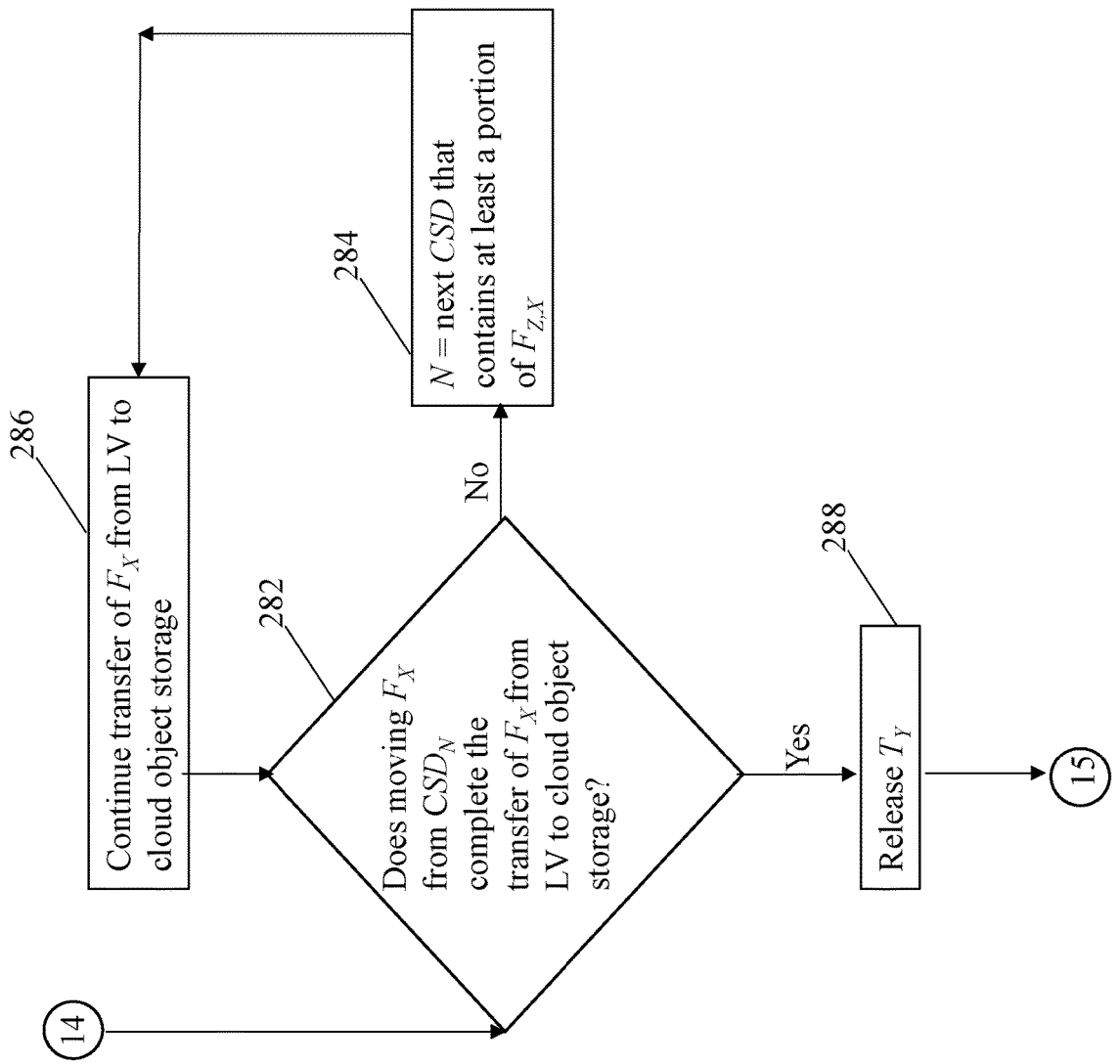
Figure 2:
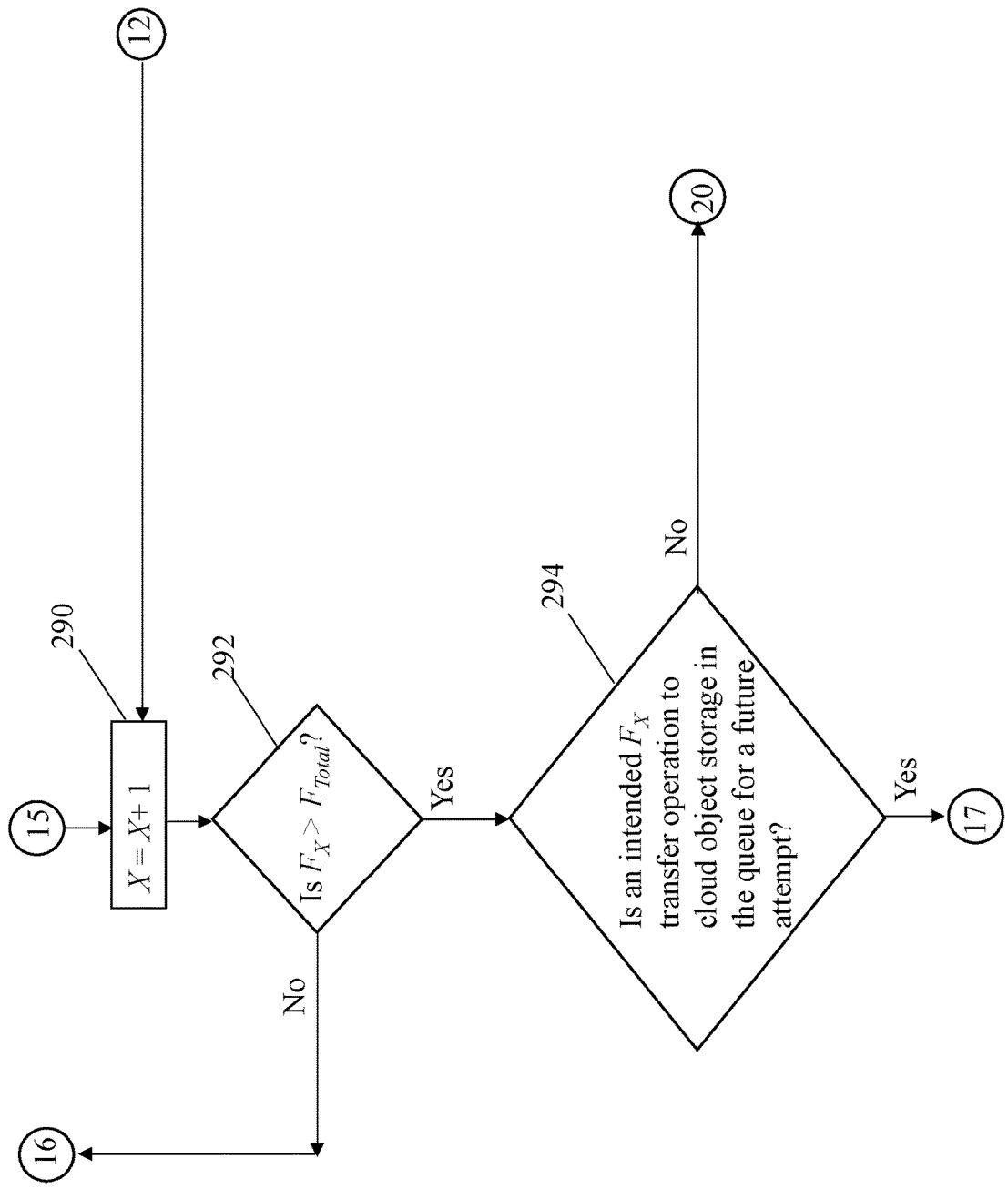
Figure 2:
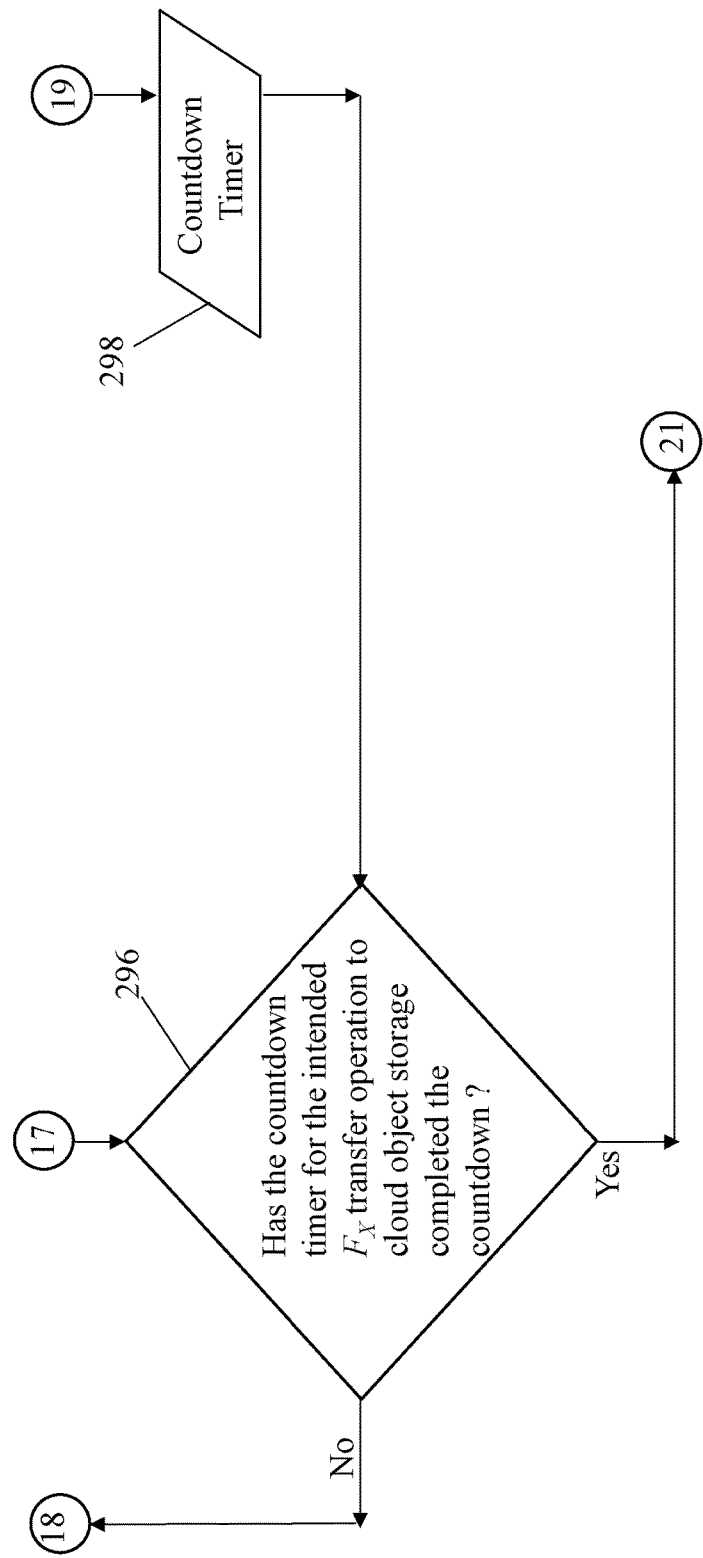

Referring to FIG. 2, a flow chart is provided illustrating a process 200 for transferring data. Referring to FIGS. 1 and 2, each of the archival managers 172, 192, and 196 determines 202 one or more files designated to be moved (archived) from one or more of the suite of storage controllers, including the first, second, and $M^{th}$ storage controllers 102, 104, and 106, respectively. Each of the finite number of application processing threads 1/1-1/N, 2/1-2/N, and M/1-M/N within the pluralities of application processing threads 174, 176, and 178, respectively, as well as the application processing threads (not shown) within the archival managers 192 and 196 includes sufficient logic to scan the files on the associated controller storage devices (with a predetermined periodicity) and determine if a file should be moved, i.e., archived per the associated archival policy (or by operator command). For example, and without limitation, each application processing thread 1/1-1/N of the plurality of application processing threads 174 scans the associated logical volumes on the controller storage devices 1/1-1/N of the first plurality of controller storage devices 110 in the first storage controller 102. One of the criteria for archiving a file includes policy-based temporal expiration criteria. Another criteria for archiving a file includes data file unreferenced criteria, for example, and without limitation, policy-based direction to automatically archive any files that have not been referenced for a predetermined period of time (e.g., seven days) and those files dissociated from abandoned or otherwise removed applications. Accordingly, regardless of the origin of the conditions for archiving data files, the archival managers 172, 192, and 196 determine the files ready for archiving.

Each of the archival managers 172, 192, and 196 determines 204 by the associated application processing thread the logical volume (LV) on which the file(s) to be moved are currently resident, determines 206 the storage controller 102, 104, and 106 and determines 208 the controller storage device(s) 110, 112, and 114 within the associated storage controller where the identified logical volume is currently resident, and determines 210 the processor(s) associated with the identified controller storage device(s) 110, 112, and 114. In at least one embodiment, the controller storage device(s) determination operation 208 includes determining, by the associated application processing thread, if the logical volume on which the file(s) to be moved are currently resident include large files and large groups of files that cause the associated logical volumes to extend across multiple controller storage devices. Accordingly, the archival managers 172, 192, and 196 determine the logical volumes to process and at least partially establish the potential global serialization resources that may be required if any of the files to be archived are to be moved to the could object storage array 130.

A determination 212 is performed by the associated archival manager 172, 192, and 196 if any of the files identified in the determination operation 202 for archiving are designated for archiving in the cloud object storage array 130. The associated application processing thread 174, 176, and 178 within the archival manager 172, or the equivalents in the archival managers 192 and 196, include sufficient logic to distinguish between files designated for cloud storage and non-cloud storage based on policy criteria or operator direction, and determine the destination for the data transfer based on the assessed distinguishment. In a manner similar to that described for the determination operation 202, the archival manager 172, or the equivalents in the archival managers 192 and 196, executes the determination operation 210 based on the policy criteria or operator direction, where the cost of storage is at least one factor in the determination 212. A negative response to the determination operation 202 results in moving 214 the designated file(s) from the associated logical volume of the associated controller storage devices within the associated storage controller(s) to one or more of the directed non-cloud storage devices 152 and 154 through standard software-driven I/O features as indicated by arrows 162, 164, and 166. Upon completion of archiving the determined files from the associated logical volume per the move operation 214, the process 200 returns to the determination operation 202. Accordingly, the archival managers 172, 192, and 196 execute the archiving of data files designated for non-cloud storage.

A positive response to the determine operation 212 indicates that at least one file identified for archiving is to be archived in the cloud object storage array 130. A variable $CSD_{Total}$ is assigned 215 to represent a quantity of controller storage devices within the identified storage controller that will be operated on during the process 200 based on the knowledge of the files designated for archiving and the logical volumes the files are located. Typically, the value of $CSD_{Total}$ will be one, however, the identified logical volume may extend across two or more controller storage devices. The variable $CSD_N$ is individually assigned 216 to each of the $CSD_{Total}$ controller storage devices to be operated on. A corresponding controller storage device (CSD) variable, N, is initialized 218 at the first controller storage device of the one or more controller storage devices that contain at least a portion of the present logical volume.

A determination 220 is made, by the associated application processing thread, as to whether all of the files on the present logical volume that have been designated to be archived are also designated to be moved to the cloud object storage array 130. A negative response to the determination operation 220 results in engaging the global serialization algorithm and is discussed further below. A positive response to the determination operation 220 results in a variable $T_{Total}$ assigned 222 to represent a quantity of storage controller data movement threads 120, 122, and 124 that could possibly be used for the selected controller storage device $CSD_N$. As discussed herein, in some embodiments, each of storage controllers 102, 104, and 106 have six storage controller data movement threads 120, 122, and 124, respectively. Further, in the exemplary embodiment, the six storage controller data movement threads 120, 122, and 124 are evenly divided between the two processors 1/1 and 1/2, 2/1 and 2/2, and M/1 and M/2, respectively, and the value for $T_{Total}$ is 3. In at least some embodiments, the value of $T_{Total}$ is selectable, and any value of $T_{Total}$ that enables operation of the global computing system 100 and the process 200 as described herein is used. The variable $T_Y$ is individually assigned 224 to each of the $T_{Total}$ storage controller data movement threads that may be obtained for the particular processor. A corresponding storage controller data movement thread (T) variable, Y, is initialized 226.

A determination 228 is made if the requested storage controller data movement thread $T_Y$ is available. In at least some embodiments, each of the archival managers 172, 192, and 196 is attempting to obtain a storage controller data movement thread for one of the storage controllers 102, 104, and 106, and it is inevitable that two or more of the archival managers 172, 192, and 196 attempt to obtain a storage controller data movement thread in the same controller. Therefore, the storage controller data movement threads are obtained through a first-come-first-served basis, and a queuing process for thread requests is implemented, as discussed further herein.

A negative response to the determination operation 228 results in the storage controller data movement thread (T) variable Y being incremented 230. It is then determined 232 if all of the storage controller data movement threads $T_Y$ have been requested. A negative response to the determination operation 232 returns the process 200 to the determination operation 228. A positive response to the determination operation 232 initiates a queueing process that is described further herein. A positive response to the determination operation 228 results in the associated application processing thread in the associated archival manager obtaining 234 a temporary exclusive lock on the storage controller data movement thread $T_Y$, and therefore the application processing thread obtains the temporary exclusive lock on the global serialization resource and initiates 236 the file transfer from the logical volume to the associated cloud storage device 132, 134, and 136 in the cloud object storage array 130 as shown by the arrows 142, 144, and 146.

A determination 238 is made if the archiving of the intended file(s) from the present controller storage device $CSD_N$ is complete, i.e., it is determined if the entire present logical volume LV reside on the present controller storage device $CSD_N$ such that the designated file(s) have been successfully transferred to the cloud object storage array 130. A negative response to the determination operation 238 results in the variable N being incremented 240 to the next integer value of N for the controller storage device $CSD_N$ that contains at least a portion of the present logical volume including the file(s) designated for archiving in the cloud object storage array 130. The file transfer continues 242 from the present logical volume to the cloud object storage array 130 and a return to the determination operation 238 is performed. Accordingly, regardless of the extent of the logical volumes across the controller storage devices, the process 200 will perform file transfers in a complete and serialized manner. A positive response to the determination operation 238, i.e., completion of the archiving of the designated file(s) from the selected logical volume results in a release 244 of the temporary exclusive lock on the storage controller data movement thread $T_Y$. Accordingly, the exclusive lock on the associated global serialization resource, including the obtained storage controller data movement thread $T_Y$ and associated processor, is held temporarily throughout the archiving of the files on the selected logical volume and is released when the transfer is done.

Returning to the determination operation 232, a positive response to the determination 232 that all of the storage controller data movement threads $T_Y$ have been requested results in the request for the intended transfer operation for the files in the presently selected logical volume to the cloud object storage array 130 to be placed 246 into a queue for a future attempt. Storage of each of the transfer requests in the queue is managed by the associated application processing thread. Once the storage controller data movement thread $T_Y$ is released 244, a determination 248 is made if there is a pending transfer operation residing in the queue as a result of the queue placement operation 246. A negative response to the determination operation 248 results in a return to the determination operation 202. A positive response to the determination operation 248 results in the process 200 proceeding to a determination 250 of whether a countdown timer 252 for the archival requests in the queue for the intended logical volume to the cloud object storage array 130 has completed the associated countdown such that the time allotted for the residency of the archival request in the queue has expired. In at least one embodiment, the countdown timer 252 has a predetermined countdown period within a range extending between, and including, 15 seconds to 120 seconds. In at least one alternative embodiment, the countdown time 252 has any predetermined countdown period that enables operation of the global computing system 100 as described herein, including operator-adjustable values.

A negative response to the determination operation 250 results in a return of the process 200 to the initiation operation 226 for obtaining a storage controller data movement thread $T_Y$ to reattempt obtaining one of the possible threads for a transfer of the associated file(s). The countdown timer 252 prevents unlimited attempts to obtain a storage controller data movement thread $T_Y$ to execute the pending archival operation(s). Once the storage controller data movement thread is obtained, all of the files in the queue are transferred per transfer operations 238 through 242. The attempts to move the files that have an associated transfer request in the queue will be looped until the countdown timer finishes the countdown, where the attempt to move the file(s) could be abandoned. In general, it is expected that access to a storage controller data movement thread $T_Y$ will eventually be attained. Failure to transfer the file(s) results in the file(s) remaining resident within the selected logical volume until the logical volume is addressed again by the associated archival manager. As such, a positive response to the determination operation 250 results in the process 200 returning to the determination operation 202. Accordingly, attempts to transfer the last of the files in the selected logical volume are executed for a finite period of time through attempting to reobtain a storage controller data movement thread $T_Y$ to effect the transfer.

Returning to the determination operation 220, it is determined if all of the files on the logical volume being processed by the associated application processing thread are designated for archiving in the cloud object storage array 130. A negative response to the determination operation 220 results in engaging the global serialization algorithm, i.e., the process 200 proceeds to a determination 254 if a percentage of the files on the presently selected logical volume exceeds a threshold value. The threshold value is based on the percentage of files during the most recent processing of the selected logical volume that required one or more storage controller data movement threads. For example, if the previous transfer included 37% of the files being archived to the cloud object storage array 130, the present threshold is 37%. In at least one embodiment, the determination of the threshold value is initialized at zero, typically if the algorithm has not yet been run on this particular logical volume. In at least alternative embodiment, a default threshold value of 40% is used as the initial value. A negative response to the determination operation 254 is discussed further herein. A positive response to the determination operation 254 results in an initiation 256 of obtaining a storage controller data movement thread to execute the file transfer operation of all files on the selected logical volume designated for the cloud object storage array 130. The process 200 then returns to the initiation operation 226 to obtain a lock on a thread to transfer all of the files designated for cloud object storage with the one thread in a manner similar to that condition where all of the files on the selected logical volume were designated for transfer to the cloud. In addition, a positive response to the determination operation 254 results in the associated application processing thread archiving 258 the designated files to the non-cloud storage devices 152 and 154.

Returning to the threshold determination operation 254, a negative response to the operation 254 results in a file-by-file processing of the files designated for archiving in the cloud object storage array 130 and the files designated for archiving in the non-cloud storage devices 152 and 154, as discussed further herein. A quantity of files on the selected logical volume designated for archiving, both cloud-based and non-cloud-based, is assigned 260 to $F_{Total}$. The variable $F_X$ is individually assigned 261 to each of the $F_{Total}$ files to be operated on. A corresponding file (F) variable, X, is initialized 262. A determination 263 is made if the present file $F_X$ is to be archived in the could object storage array 130. A negative response to the determination operation 263 results in the file $F_X$ being moved 264 to one of the designated non-cloud storage devices 152 and 154, and the process 200 directed to a file incrementing operation (discussed further herein).

A positive response to the determination operation 263 results in a variable $T_{Total}$ being assigned 266 to represent a quantity of storage controller data movement threads 120, 122, and 124 that could possibly be used for the selected controller storage device $CSD_N$. The variable $T_Y$ is individually assigned 268 to each of the $T_{Total}$ storage controller data movement threads that may be obtained for the particular processor. A corresponding storage controller data movement thread (T) variable, Y, is initialized 270.

A determination 272 is made if the requested storage controller data movement thread $T_Y$ is available. A negative response to the determination operation 272 results in the storage controller data movement thread (T) variable Y being incremented 274. It is then determined 276 if all of the storage controller data movement threads $T_Y$ have been requested. A negative response to the determination operation 276 returns the process 200 to the determination operation 272. A positive response to the determination operation 276 initiates a queueing process that is described further herein.

A positive response to the determination operation 272 results in the associated application processing thread in the associated archival manager obtaining 278 a temporary exclusive lock on the storage controller data movement thread $T_Y$, and therefore the application processing thread obtains the temporary exclusive lock on the associated global serialization resource and initiates 280 the transfer of the selected file $F_X$ from the logical volume to the associated cloud storage device 132, 134, and 136 in the cloud object storage array 130 as shown by the arrows 142, 144, and 146.

A determination 282 is made if the archiving of the intended file $F_X$ from the present controller storage device $CSD_N$ is complete, i.e., a determination that the entire present file $F_X$ resides on the present controller storage device $CSD_N$ such that the designated file $F_X$ has been successfully transferred to the cloud object storage array 130. A negative response to the determination operation 282 results in the variable N being incremented 284 to the next controller storage device $CSD_N$ that contains at least a portion of the present file $F_X$ designated for archiving in the cloud object storage array 130. The process 200 proceeds to the continue 286 the file transfer operation. Accordingly, regardless of the extent of the file $F_X$ across the controller storage devices, the process 200 will perform file transfers in a complete and serialized manner.

A positive response to the determination operation 282, i.e., the archiving of the designated file $F_X$ is complete results in a release 288 of the temporary exclusive lock on the storage controller data movement thread $T_Y$. The variable X is incremented 290 to the next integer value of X for the next file $F_X$ designated for archiving in either the cloud object storage array 130 or one of the non-cloud storage devices 152 and 154. A determination 292 is made as to whether all of the designated files $F_X$ have been processed. A negative response to the determination operation 292 results in the process 200 returning to the determination operation 263. A positive response to the determination operation 292 is discussed further herein.

Returning to the determination operation 276, a positive response to the determination 276 that all of the storage controller data movement threads $T_Y$ have been requested results in the request for the intended transfer operation for the presently selected file $F_X$ to the cloud object storage array 130 to be placed 294 into a queue for a future attempt. The storage of the requests in the queue is managed by the associated application processing thread. Also returning to the determination operation 292 as to whether all of the designated files $F_X$ in the selected logical volume have been processed. A positive response to the determination operation 292 results in a determination 294 if there is a pending transfer operation residing in the queue for one or more files from a previous attempt to transfer the file(s) $F_X$ to the cloud object storage array 130.

A positive response to the determination operation 294 results in the process 200 proceeding to a determination 296 of whether a countdown timer 298 for the archival requests in the queue for a file $F_X$ has completed the associated countdown such that the time allotted for the residency of the archival request in the queue has expired. In at least one embodiment, the countdown timer 298 has a predetermined countdown period within a range extending between, and including, 15 seconds to 120 seconds. In at least one alternative embodiment, the countdown time 298 has any predetermined countdown period that enables operation of the global computing system 100 as described herein, including operator-adjustable values. A negative response to the determination operation 296 results in a return of the process 200 to the initiation operation 270 for obtaining a storage controller data movement thread $T_Y$ to reattempt obtaining one of the possible threads. The countdown timer 298 prevents unlimited attempts to obtain a storage controller data movement thread $T_Y$ to execute the pending archival operation(s). A negative response to the determination operation 294 and a positive response to the countdown determination 296 result in the process returning to the determination operation 202.

Figure 3:
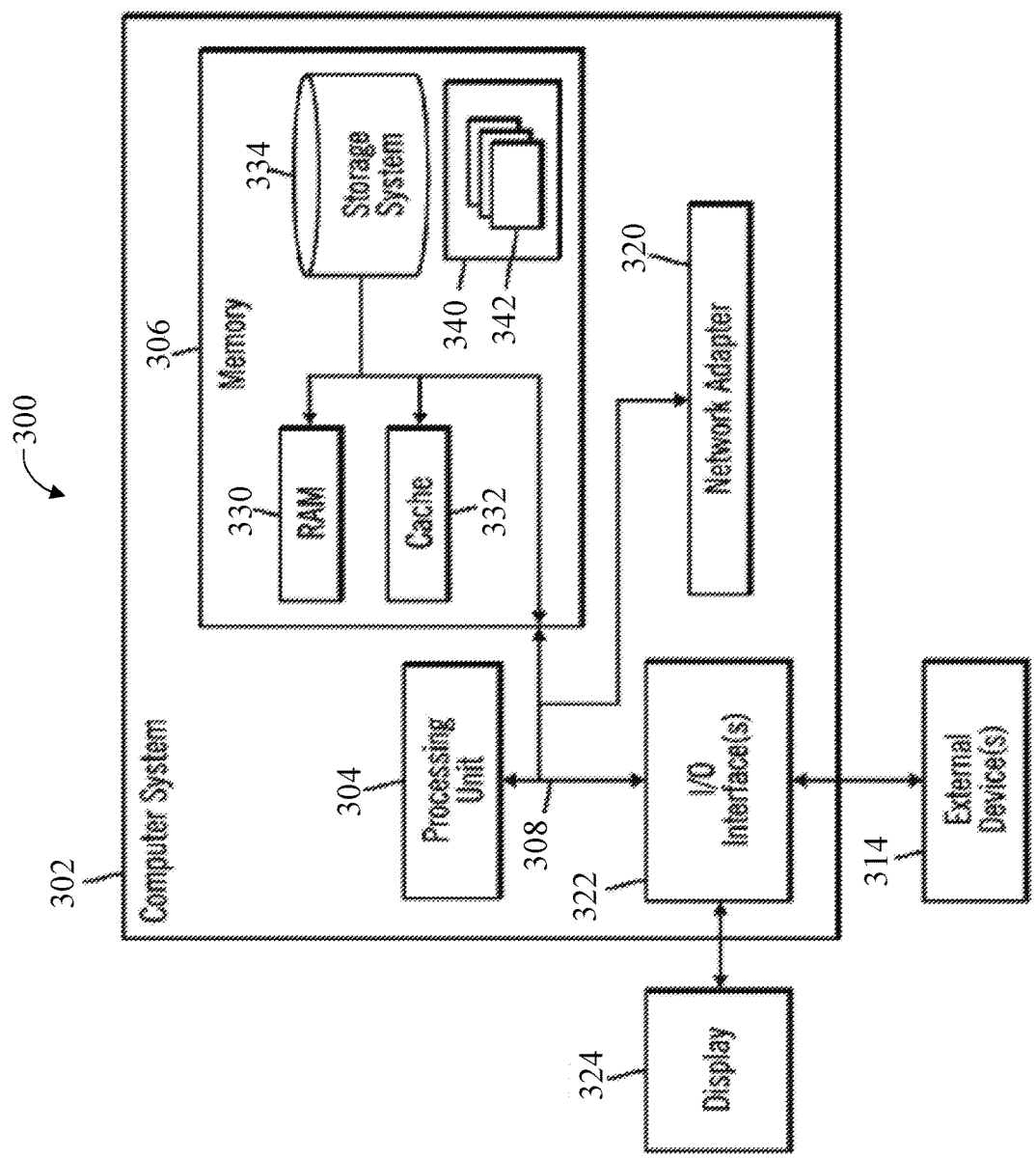
FIG. 3 is a block diagram illustrating a computer system/server of a cloud-based support system, to implement the processes described above with respect to FIGS. 1-2, in accordance with some embodiments of the present disclosure.

Aspects of the archival manager 172, including the pluralities of application processing threads 174, 176, and 178, may be embodied in a computer system/server in a single location, or in at least one embodiment, may be configured in a cloud-based system sharing computing resources. With reference to FIG. 3, a block diagram is provided illustrating an example of a computer system 300 including a computer/server 302, hereinafter referred to as a host 302 in communication with a cloud based support system, to implement the system, tools, and processes described above with respect to FIGS. 1-2. Host 302 is operational with numerous other general purpose or special purpose computer system environments or configurations. Examples of well-known computer systems, environments, and/or configurations that may be suitable for use with host 302 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and file systems (e.g., distributed storage environments and distributed cloud computing environments) that include any of the above systems, devices, and their equivalents.

Host 302 may be described in the general context of computer system-executable instructions, such as program modules, being executed by a computer system. Generally, program modules may include routines, programs, objects, components, logic, data structures, and so on that perform particular tasks or implement particular abstract data types. Host 602 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, host 302 is shown in the form of a general-purpose computing device. The components of host 302 may include, but are not limited to, one or more processors or processing devices or units 304, e.g. hardware processors, a system memory 306, and a bus 308 that couples various system components including system memory 306 to processing device 304. Bus 308 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Host 302 typically includes a variety of computer system readable media. Such media may be any available media that is accessible by host 302 and it includes both volatile and non-volatile media, removable and non-removable media.

Memory 306 can include computer system readable media in the form of volatile memory, such as random access memory (RAM) 330 and/or cache memory 332. By way of example only, a storage system 334 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces.

Program/utility 340, having a set (at least one) of program modules 342, may be stored in memory 306 by way of example, and not limitation, as well as an operating system, one or more application programs, other program modules, and program data. Each of the operating systems, one or more application programs, other program modules, and program data or some combination thereof, may include an implementation of a networking environment. Program modules 342 generally carry out the functions and/or methodologies of embodiments to dynamically capture environmental configuration changes related to applications such that co-processing a plurality of dependent systems with a finite number of processing threads is enabled. For example, the set of program modules 342 may include the archival manager 172, including the pluralities of application processing threads 174, 176, and 178, as described in FIGS. 1-2.

Host 302 may also communicate with one or more external devices 314, such as a keyboard, a pointing device, etc.; a display 324; one or more devices that enable a user to interact with host 302; and/or any devices (e.g., network card, modem, etc.) that enable host 302 to communicate with one or more other computing devices. Such communication can occur via Input/Output (I/O) interface(s) 322. Still yet, host 302 can communicate with one or more networks such as a local area network (LAN), a general wide area network (WAN), and/or a public network (e.g., the Internet) via network adapter 320. As depicted, network adapter 320 communicates with the other components of host 302 via bus 308. In at least one embodiment, a plurality of nodes of a distributed file system (not shown) is in communication with the host 302 via the I/O interface 322 or via the network adapter 320. It should be understood that although not shown, other hardware and/or software components could be used in conjunction with host 302. Examples, include, but are not limited to: microcode, device drivers, redundant processing units, external disk drive arrays, RAID systems, tape drives, and data archival storage systems, etc.

In this document, the terms "computer program medium," "computer usable medium," and "computer readable medium" are used to generally refer to media such as main memory 306, including RAM 330, cache memory 332, and storage system 334, such as a removable storage drive and a hard disk installed in a hard disk drive.

Computer programs (also called computer control logic) are stored in memory 306. Computer programs may also be received via a communication interface, such as network adapter 320. Such computer programs, when run, enable the computer system to perform the features of the present embodiments as discussed herein. In particular, the computer programs, when run, enable the processing device 304 to perform the features of the computer system. As such, computer programs may represent controllers of the computer system. Accordingly, the functionality for the archival manager 172, including the pluralities of application processing threads 174, 176, and 178, as described in FIGS. 1-2, is embodied as computer program code stored in memory 306 (in some embodiments as program modules 342), where the computer program code includes the instructions to be executed by the processing device 304 to provide the functionality of the archival manager 172, including the pluralities of application processing threads 174, 176, and 178, as described herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a dynamic or static random access memory (RAM), a read-only memory (ROM), an erasable programmable read-only memory (EPROM or Flash memory), a magnetic storage device, a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server or cluster of servers. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the embodiments. Accordingly, the functionality for the archival manager 172, including the pluralities of application processing threads 174, 176, and 178, as described in FIGS. 1-2, may be embodied as computer readable program instructions to be executed by one or more hardware devices other than, or in addition to, the processing device 304 to provide the functionality of the archival manager 172, including the pluralities of application processing threads 174, 176, and 178, as described herein.

In at least one embodiment, host 302 is a node of a cloud computing environment. It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

As is known in the art, cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Example of such characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher layer of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some layer of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 4:
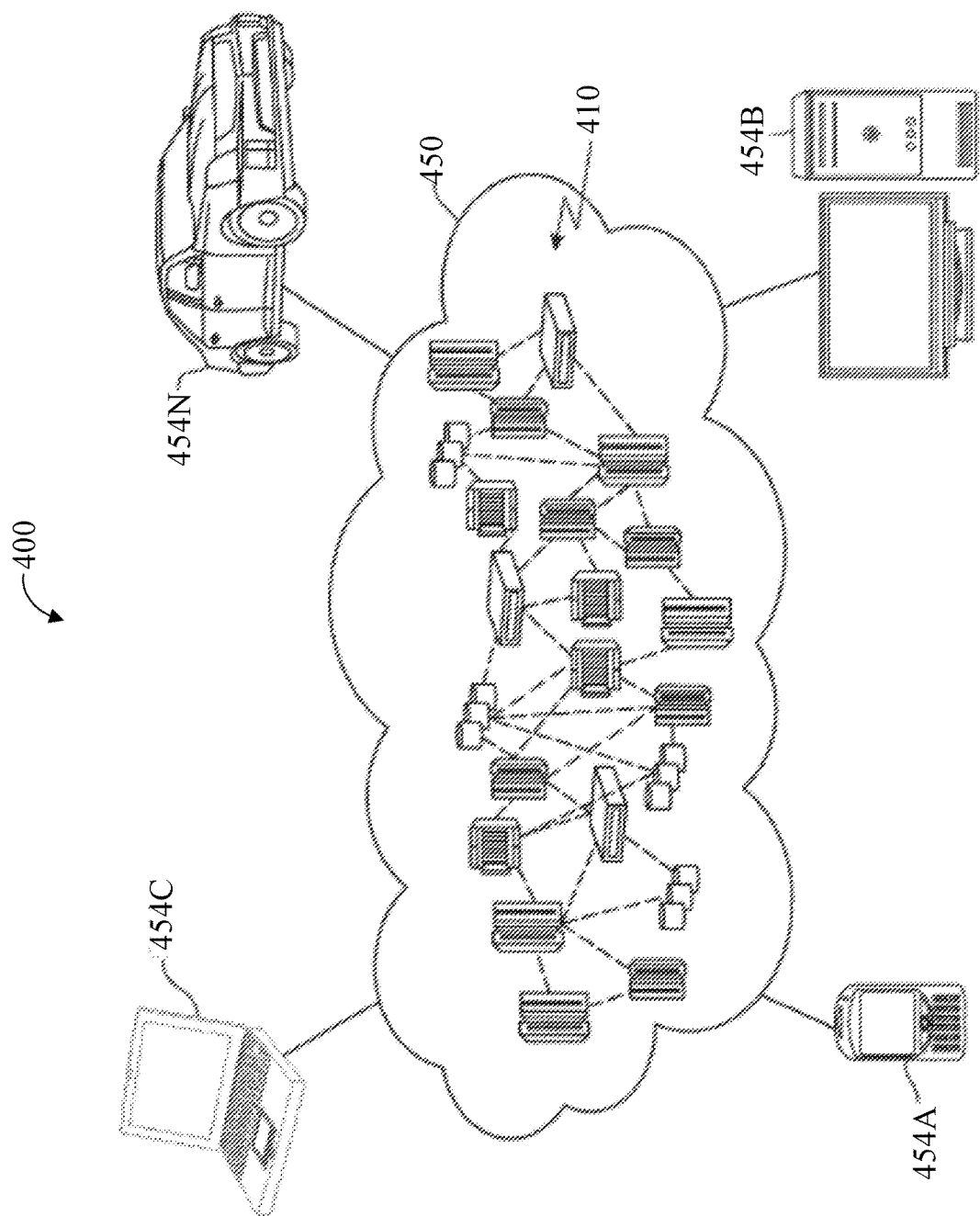
FIG. 4 is a schematic diagram illustrating a cloud computer environment, in accordance with some embodiments of the present disclosure.

Referring now to FIG. 4, a schematic diagram is provided illustrating an example cloud computing network 400. As shown, cloud computing network 400 includes a cloud computing environment 450 having one or more cloud computing nodes 410 with which local computing devices used by cloud consumers may communicate. Examples of these local computing devices include, but are not limited to, personal digital assistant (PDA) or cellular telephone 454A, desktop computer 454B, laptop computer 454C, and/or automobile computer system 454N. Individual nodes within nodes 410 may further communicate with one another. They may be grouped (not shown) physically or virtually, in one or more networks, such as Private, Community, Public, or Hybrid clouds as described hereinabove, or a combination thereof. This allows the cloud computing network 400 to offer infrastructure, platforms and/or software as services for which a cloud consumer does not need to maintain resources on a local computing device. It is understood that the types of computing devices 454A-N shown in FIG. 4 are intended to be illustrative only and that the cloud computing environment 450 can communicate with any type of computerized device over any type of network and/or network addressable connection (e.g., using a web browser).

Figure 5:
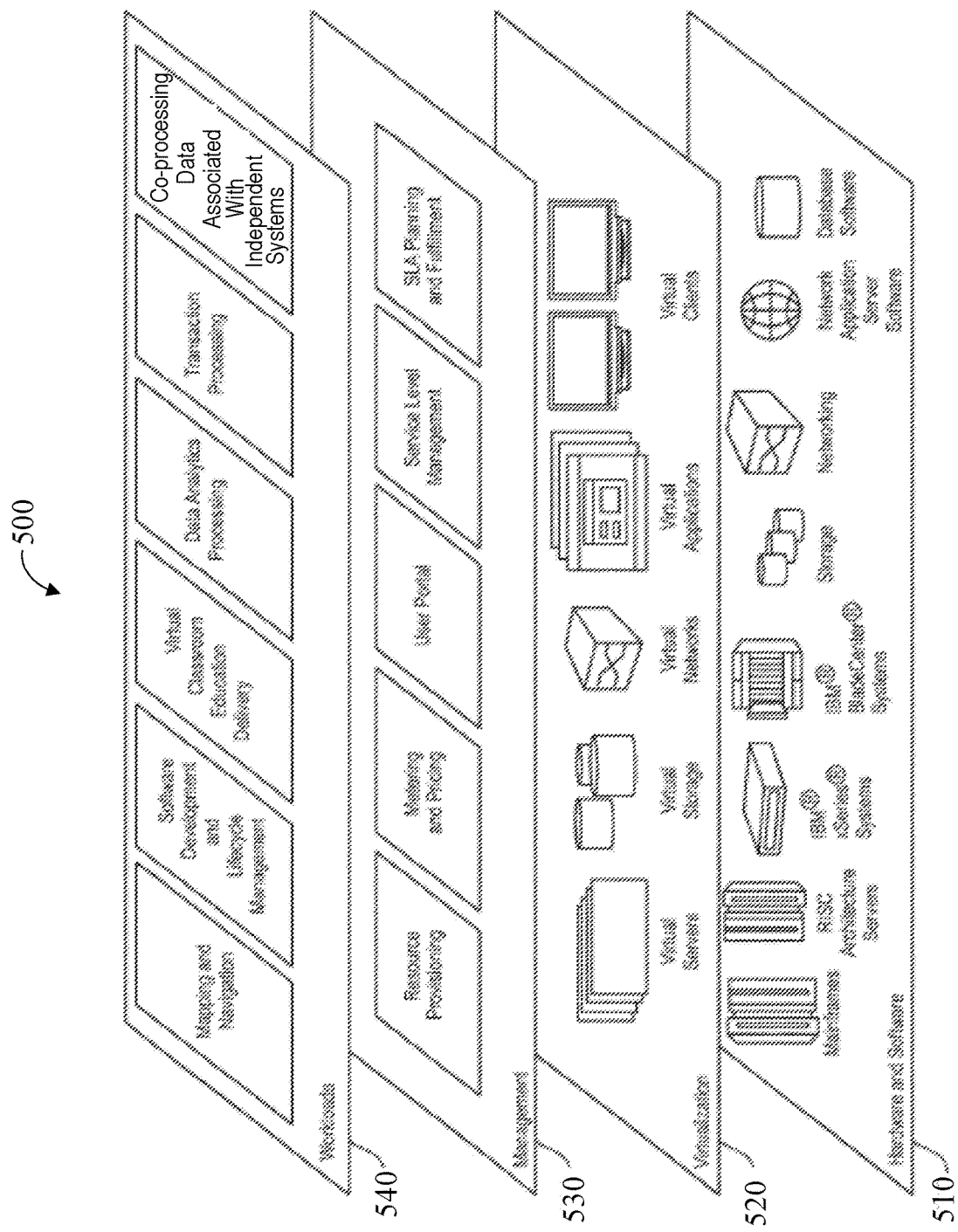
FIG. 5 is a block diagram illustrating a set of functional abstraction model layers provided by the cloud computing environment, in accordance with some embodiments of the present disclosure.

Referring now to FIG. 5, a set of functional abstraction layers 500 provided by the cloud computing network of FIG. 4 is shown. It should be understood in advance that the components, layers, and functions shown in FIG. 5 are intended to be illustrative only, and the embodiments are not limited thereto. As depicted, the following layers and corresponding functions are provided: hardware and software layer 510, virtualization layer 520, management layer 530, and workload layer 540.

The hardware and software layer 510 include hardware and software components. Examples of hardware components include mainframes; RISC (Reduced Instruction Set Computer) architecture-based servers; servers; blade servers; storage devices; networks and networking components. Examples of software components include network application server software, and database software.

Virtualization layer 520 provides an abstraction layer from which the following examples of virtual entities may be provided: virtual servers; virtual storage; virtual networks, including virtual private networks; virtual applications and operating systems; and virtual clients.

In one example, management layer 530 may provide the following functions: resource provisioning, metering and pricing, user portal, service layer management, and SLA planning and fulfillment. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service layer management provides cloud computing resource allocation and management such that required service layers are met. Service Layer Agreement (SLA) planning and fulfillment provides prearrangement for, and procurement of, cloud computing resources for which a future requirement is anticipated in accordance with an SLA.

Workloads layer 540 provides examples of functionality for which the cloud computing environment may be utilized. Examples of workloads and functions which may be provided from this layer include, but are not limited to: mapping and navigation; software development and lifecycle management; virtual classroom education delivery; data analytics processing; transaction processing; and co-processing data associated with a plurality of independent systems with a finite number of processing threads.

It will be appreciated that there is disclosed herein a system, method, apparatus, and computer program product for evaluating natural language input, detecting an interrogatory in a corresponding communication, and resolving the detected interrogatory with an answer and/or supporting content.

While particular embodiments of the present disclosure have been shown and described, it will be obvious to those skilled in the art that, based upon the teachings herein, changes and modifications may be made without departing from the embodiments and its broader aspects. Therefore, the appended claims are to encompass within their scope all such changes and modifications as are within the true spirit and scope of the embodiments. Furthermore, it is to be understood that the embodiments are solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to embodiments containing only one such element, even when the same claim includes the introductory phrases "one or more" or "at least one" and indefinite articles such as "a" or "an"; the same holds true for the use in the claims of definite articles.

The present embodiments may be a system, a method, and/or a computer program product. In addition, selected aspects of the present embodiments may take the form of an entirely hardware embodiment, an entirely software embodiment (including firmware, resident software, micro-code, etc.) or an embodiment combining software and/or hardware aspects that may all generally be referred to herein as a "circuit," "module" or "system." Furthermore, aspects of the present embodiments may take the form of computer program product embodied in a computer readable storage medium (or media) having computer readable program instructions thereon for causing a processor to carry out aspects of the present embodiments. Thus embodied, the disclosed system, a method, and/or a computer program product is operative to improve the functionality and operation of a computer-based system or platform.

Aspects of the present embodiments are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be appreciated that, although specific embodiments have been described herein for purposes of illustration, various modifications may be made without departing from the spirit and scope of the embodiments. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein. Accordingly, the scope of protection of the embodiments is limited only by the following claims and their equivalents.

What is claimed is:

1. A computer system comprising:
   one or more processing devices;
   a plurality of storage devices communicatively coupled with the one or more processing devices, wherein the plurality of storage devices comprises one or more first storage devices and one or more second storage devices;
   one or more memory devices communicatively coupled with the one or more processing devices; and
   one or more archival managers communicatively coupled with the one or more memory devices, the one or more archival managers configured to:
      determine data designated for transfer from a logical volume associated with the one or more first storage devices to the one or more second storage devices, wherein the data in the logical volume includes one or more data files;
      distinguish the one or more data files designated for transfer as one of a first data type and a second data type, the first data type configured to use an assignment of one thread resource of a plurality of thread resources associated with the one or more first storage devices to execute the transfer of the one or more data files of the first data type, thereby defining an assigned thread resource, the second data type configured to transfer without the assigned thread resource;
      determine one or more thread resources of the plurality of thread resources available for transferring the one or more data files of the first data type as the assigned thread resource; and
      transfer, individually, each data file of the first data type in the logical volume designated for transfer, from the one or more first storage devices to the one or more second storage devices through each assigned thread resource.

2. The system of claim 1, further comprising the one or more archival managers configured to:
   process each data file of the one or more data files of the first data type in the logical volume designated for transfer;
   obtain, individually, for each data file of the first data type in the logical volume designated for transfer, the assigned thread resource; and
   release the assigned thread resource for each data file of the first data type upon completion of the transfer thereof, wherein obtainment of the assigned thread resource, transfer of each data file of the first data type in the logical volume designated for transfer, and release of the assigned thread resource are performed in a serialized manner.

3. The system of claim 1, further comprising the one or more archival managers configured to:
   determine no thread resources are available to transfer a first data file of the first data type in the logical volume designated for transfer;
   place a transfer request for the first data file of the first data type in the logical volume designated for transfer into a data transfer queue; and
   reattempt obtaining the assigned thread resource for transferring the first data file of the first data type in the logical volume designated for transfer.

4. The system of claim 3, further comprising the one or more archival managers configured to:
   maintain the transfer request for the first data file of the first data type in the logical volume designated for transfer in the data transfer queue for a predetermined period of time; and
   abandon the attempted transfer of the first data file of the first data type in the logical volume designated for transfer.

5. The system of claim 1, the one or more second storage devices comprising one or more non-cloud-based storage devices, further comprising the one or more archival managers configured to:
   determine the logical volume includes one or more data files of the second data type designated for transfer; and
   process each data file of the one or more data files of the second data type in the logical volume designated for transfer including transfer all of the data files of the second data type in the logical volume designated for transfer to the one or more non-cloud-based storage devices.

6. The system of claim 1, the one or more second storage devices comprising one or more non-cloud-based storage devices, wherein distinguishment of the data files designated for transfer as one of the first data type and the second data type comprises the one or more archival managers to:
   determine that all of the data files in the logical volume designated for transfer is the second data type; and
   transfer all of the data files in the logical volume designated for transfer to the one or more non-cloud-based storage devices.

7. The system of claim 1, the one or more second storage devices comprising one or more cloud-based storage devices, wherein distinguishment of the data files designated for transfer as one of the first data type and the second data type includes a determination that all of the data files designated for transfer are the first data type, further comprising the one or more archival managers configured to:
   obtain a temporary exclusive lock on the assigned thread resource;
   transfer all of the data files on the logical volume designated for transfer to the one or more cloud-based storage devices through the assigned thread resource; and
   release the lock on the assigned thread resource.

8. The system of claim 7, wherein the determination of the thread resources available for transferring the data further comprises the one or more archival managers configured to:
   determine no thread resources are available to transfer the data files of the logical volume designated for transfer;
   place a transfer request for the data files of the logical volume designated for transfer into a data transfer queue; and
   reattempt obtaining the assigned thread resource for transferring the data files of the logical volume designated for transfer.

9. A computer program product for co-processing a plurality of dependent systems with a finite number of processing threads, the computer program product comprising:
   one or more computer readable storage media; and
   program instructions collectively stored on the one or more computer-readable storage media, the program instructions comprising:
      program instructions to determine data designated for transfer from a logical volume associated with one or more first storage devices to one or more second storage devices, wherein the data in the logical volume includes one or more data files;

program instructions to distinguish the one or more data files designated for transfer as one of a first data type and a second data type, the first data type configured to use an assignment of one thread resource of a plurality of thread resources to execute the transfer of the one or more data files of the first data type, thereby defining an assigned thread resource, the second data type configured to transfer without the assigned thread resource;

program instructions to determine a threshold value for the logical volume, the threshold value representative of a percentage of data files corresponding to the first data type in at least one previous processing event of the logical volume;

program instructions to determine the threshold value is not exceeded;

program instructions to determine one or more thread resources of the plurality of thread resources available for transferring the one or more data files of the first data type as the assigned thread resource; and program instructions to process each data file of the one or more data files of the first data type in the logical volume designated for transfer comprising:

program instructions to obtain, individually, for each data file of the first data type in the logical volume designated for transfer, the assigned thread resource; and program instructions to transfer, individually, each data file of the first data type in the logical volume designated for transfer, from the one or more first storage devices to the one or more second storage devices, through each assigned thread resource.

10. The computer program product of claim 9, further comprising program instructions to:

determine no thread resources are available to transfer a first data file of the first data type in the logical volume designated for transfer;

place a transfer request for the first data file of the first data type in the logical volume designated for transfer into a data transfer queue;

reattempt obtaining the assigned thread resource for transferring the first data file of the first data type in the logical volume designated for transfer;

maintain the transfer request for the first data file of the first data type in the logical volume designated for transfer in the data transfer queue for a predetermined period of time; and abandon the attempted transfer of the first data file of the first data type in the logical volume designated for transfer.

11. The computer program product of claim 9, the one or more second storage devices including one or more non-cloud-based storage devices, further comprises program instructions to execute an operation selected from the group consisting of:

determine the logical volume includes one or more data files of the second data type designated for transfer, and process each data file of the one or more data files of the second data type in the logical volume designated for transfer including transfer all of the data files of the second data type in the logical volume designated for transfer to the one or more non-cloud-based storage devices; and determine that all of the data files in the logical volume designated for transfer is the second data type and transfer all of the data files in the logical volume designated for transfer to the one or more non-cloud-based storage devices.

12. The computer program product of claim 9, the one or more second storage devices including one or more cloud-based storage devices, wherein all of the data files designated for transfer are the first data type, further comprising program instructions to:

obtain a temporary exclusive lock on the assigned thread resource;

transfer all of the data files on the logical volume designated for transfer to the one or more cloud-based storage devices through the assigned thread resource; and release the lock on the assigned thread resource.

13. A computer-implemented method comprising:

determining data designated for transfer from a logical volume associated with one or more first storage devices to one or more second storage devices, wherein the data in the logical volume includes one or more data files;

distinguishing the one or more data files designated for transfer as one of a first data type and a second data type, the first data type configured to use an assignment of one thread resource of a plurality of thread resources to execute the transfer of the one or more data files of the first data type, thereby defining an assigned thread resource, the second data type configured to transfer without the assigned thread resource;

determining one or more thread resources of the plurality of thread resources available for transferring the one or more data files of the first data type as the assigned thread resource; and transferring, individually, each data file of the first data type in the logical volume designated for transfer, from the one or more first storage devices to the one or more second storage devices through each assigned thread resource.

14. The method of claim 13, wherein processing each data file further comprises:

processing each data file of the one or more data files of the first data type in the logical volume designated for transfer comprising:

obtaining, individually, for each data file of the first data type in the logical volume designated for transfer, the assigned thread resource; and releasing the assigned thread source for each data file of the first data type upon completion of the transfer thereof, wherein obtaining the assigned thread resource, transferring each data file of the first data type in the logical volume designated for transfer, and releasing the assigned thread resource are performed in a serialized manner.

15. The method of claim 13, wherein determining thread resources available for transferring the data further comprises:
- determining no thread resources are available to transfer a first data file of the first data type in the logical volume designated for transfer;
- placing a transfer request for the first data file of the first data type in the logical volume designated for transfer into a data transfer queue; and
- reattempting obtaining the assigned thread resource for transferring the first data file of the first data type in the logical volume designated for transfer.

16. The method of claim 15, wherein determining the thread resources available for transferring the data further comprises:
- maintaining the transfer request for the first data file of the first data type in the logical volume designated for transfer in the data transfer queue for a predetermined period of time; and
- abandoning the attempted transfer of the first data file of the first data type in the logical volume designated for transfer.

17. The method of claim 13, wherein the second storage devices include non-cloud-based storage devices, the method further comprising:
- determining the logical volume includes one or more data files of the second data type designated for transfer; and
- processing each data file of the one or more data files of the second data type in the logical volume designated for transfer comprising transferring all of the data files of the second data type in the logical volume designated for transfer to the one or more non-cloud-based storage devices.

18. The method of claim 13, wherein the second storage devices include one or more non-cloud-based storage devices, wherein distinguishing the data files designated for transfer is one of the first data type and the second data type comprises:
- determining that all of the data files in the logical volume designated for transfer is the second data type, the method further comprising:
  - transferring all of the data files in the logical volume designated for transfer to the one or more non-cloud-based storage devices.

19. The method of claim 13, wherein the second storage devices include cloud-based storage devices, wherein distinguishing the data files designated for transfer is one of the first data type and the second data type comprises determining that all of the data files designated for transfer are the first data type, the method further comprising:
- obtaining a temporary exclusive lock on the assigned thread resource;
- transferring all of the data files on the logical volume designated for transfer to one or more cloud-based storage devices through the assigned thread resource; and
- releasing the lock on the assigned thread resource.

20. The method of claim 19, wherein determining thread resources available for transferring the data further comprises:
- determining no thread resources are available to transfer data files of the logical volume designated for transfer;
- placing a transfer request for the data files of the logical volume designated for transfer into a data transfer queue; and
- reattempting obtaining the assigned thread resource for transferring the data files of logical volume designated for transfer.

* * * * *